US012671655B2

(12) United States Patent
Geng et al.

(10) Patent No.: US 12,671,655 B2
(45) Date of Patent: Jun. 30, 2026

(54) BIER PACKET FORWARDING METHOD, DEVICE, AND SYSTEM

(71) Applicant: Huawei Technologies Co., Ltd., Shenzhen (CN)

(72) Inventors: Xuesong Geng, Beijing (CN); Zhenbin Li, Beijing (CN); Jingrong Xie, Beijing (CN); Shuying Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 262 days.

(21) Appl. No.: 18/315,166

(22) Filed: May 10, 2023

(65) Prior Publication Data

US 2023/0283554 A1     Sep. 7, 2023

Related U.S. Application Data

(63) Continuation of application No. PCT/CN2021/129377, filed on Nov. 8, 2021.

(30) Foreign Application Priority Data

Nov. 11, 2020    (CN) .......................... 202011250272.9

(51) Int. Cl.
 *H04L 45/741* (2022.01)
 *H04L 45/02* (2022.01)
 *H04L 45/745* (2022.01)
(52) U.S. Cl.
 CPC ............ *H04L 45/741* (2013.01); *H04L 45/04* (2013.01); *H04L 45/745* (2013.01)

(58) Field of Classification Search
 CPC ..... H04L 45/741; H04L 45/04; H04L 45/745; H04L 45/16; H04L 45/50; H04L 45/74;
 (Continued)

(56) References Cited

U.S. PATENT DOCUMENTS 10,057,162 B1 * 8/2018 Singh ................... H04L 61/103
2015/0131660 A1   5/2015 Shepherd et al.
 (Continued)

FOREIGN PATENT DOCUMENTS

CN    106656524 A    5/2017
CN    109995634 A    7/2019
 (Continued)

OTHER PUBLICATIONS

IJ. Wijnands et al, "Multicast Using Bit Index Explicit Replication (BIER)", Internet Engineering Task Force (IETF), RFC8279, Nov. 2017, total 43 pages.
 (Continued)

*Primary Examiner* — Kibrom T Hailu
(74) *Attorney, Agent, or Firm* — Slater Matsil, LLP

(57) ABSTRACT

A first network device receives a BIER packet sent by a second network device, where the BIER packet includes an IPv6 header, a BIER header, and a multicast packet, a destination address of the IPv6 header or a first field of the BIER header carries a service identifier, and the service identifier identifies a virtual private network VPN instance. The first network device determines a VRF table based on the service identifier and a first correspondence, where the first correspondence includes a correspondence between the service identifier and the VRF table. The first network device sends the multicast packet to a first CE device in the VRF table based on the VRF table.

20 Claims, 9 Drawing Sheets

A first network device receives a BIER packet sent by a second network device, where the BIER packet includes an IPv6 header, a BIER header, and a multicast packet, and a destination address of the IPv6 header or a first field of the BIER header carries a service identifier — 610

The first network device determines a VRF table based on the service identifier and a first correspondence, where the first correspondence includes a correspondence between the service identifier and the VRF table — 620

The first network device sends the multicast packet to a first customer edge CE device in the VRF table based on the VRF table — 630

(58) Field of Classification Search
CPC ... H04L 12/12; H04L 12/4645; H04L 47/125; H04L 49/201
See application file for complete search history.

(56) References Cited

U.S. PATENT DOCUMENTS

| | | | |
|---|---|---|---|
| 2019/0028381 A1 | 1/2019 | Li et al. | |
| 2019/0058606 A1* | 2/2019 | Wijnands | H04L 45/16 |
| 2019/0097944 A1* | 3/2019 | Kotalwar | H04L 12/185 |
| 2020/0112503 A1 | 4/2020 | Zhang et al. | |
| 2020/0195556 A1* | 6/2020 | Tang | H04L 45/741 |
| 2020/0412562 A1* | 12/2020 | Peng | H04L 45/16 |

FOREIGN PATENT DOCUMENTS

| | | |
|---|---|---|
| CN | 110891022 A | 3/2020 |
| CN | 111147383 A | 5/2020 |
| CN | 111669330 A | 9/2020 |
| CN | 111917622 A | 11/2020 |
| CN | 112491706 A | 3/2021 |
| JP | 2005051651 A | 2/2005 |
| JP | 2011501602 A | 1/2011 |
| WO | 2018193285 A1 | 10/2018 |

OTHER PUBLICATIONS

Xie, Huawei Technologies et al., "Encapsulation for BIER in Non-MPLS IPv6 Networks; draft-xie-bier-ipv6-encapsulation-07. txt", No. 7, Jun. 29, 2020 (Jun. 29, 2020), pp. 1-19, XP015140290.

Xie Huawei Technologies et al., "Use of Bier IPv6 Encapsulation (BIERv6) for Multicast VPN in IPv6 networks; draft-xie-bier-ipv6-mvpn-02. txt", No. 2, Jan. 14, 2020 (Jan. 14, 2020), pp. 1-11, XP015137307.

* cited by examiner

| BIFT-ID | | TC | S | TTL | BIER header |
| Nibble (nibble) | Ver | BSL | Entropy (entropy) | | |
| OAM | RSV | DSCP | Protocol (proto) | BFIR-ID | |
| Bit string (bit string) | | | | | |

FIG. 3

| Ver | BSL | Entropy (entropy) | | BIER header |
| BFIR-ID | | DS | Protocol (proto) | |
| SI | Sub-domain (sub-domain) | RSV | TTL | |
| Bit string (bit string) | | | | |

FIG. 4

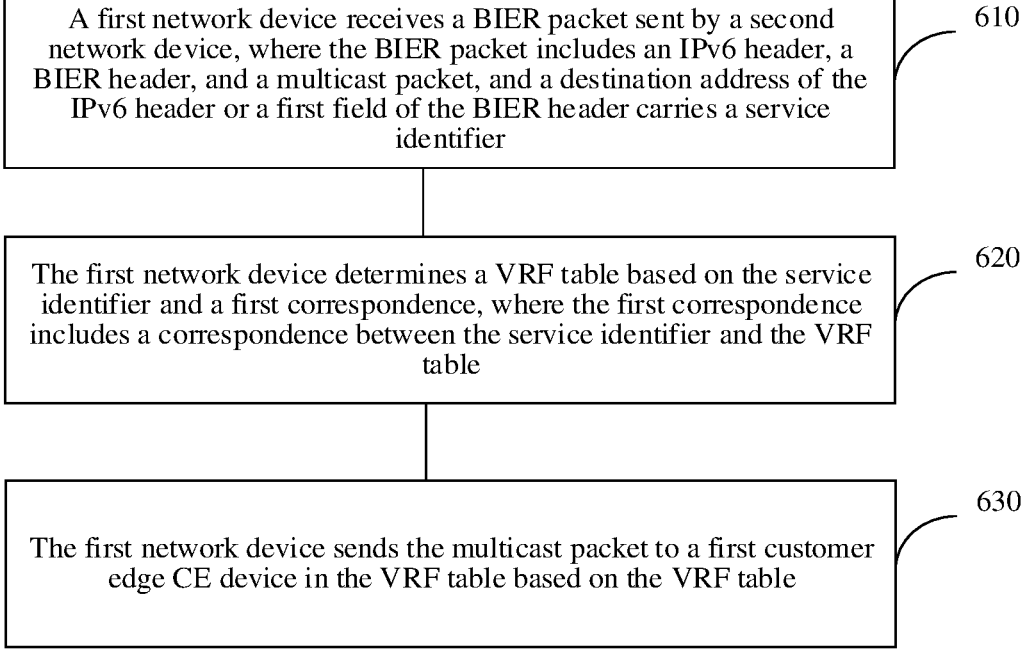

A first network device receives a BIER packet sent by a second network device, where the BIER packet includes an IPv6 header, a BIER header, and a multicast packet, and a destination address of the IPv6 header or a first field of the BIER header carries a service identifier — 610

The first network device determines a VRF table based on the service identifier and a first correspondence, where the first correspondence includes a correspondence between the service identifier and the VRF table — 620

The first network device sends the multicast packet to a first customer edge CE device in the VRF table based on the VRF table — 630

FIG. 6

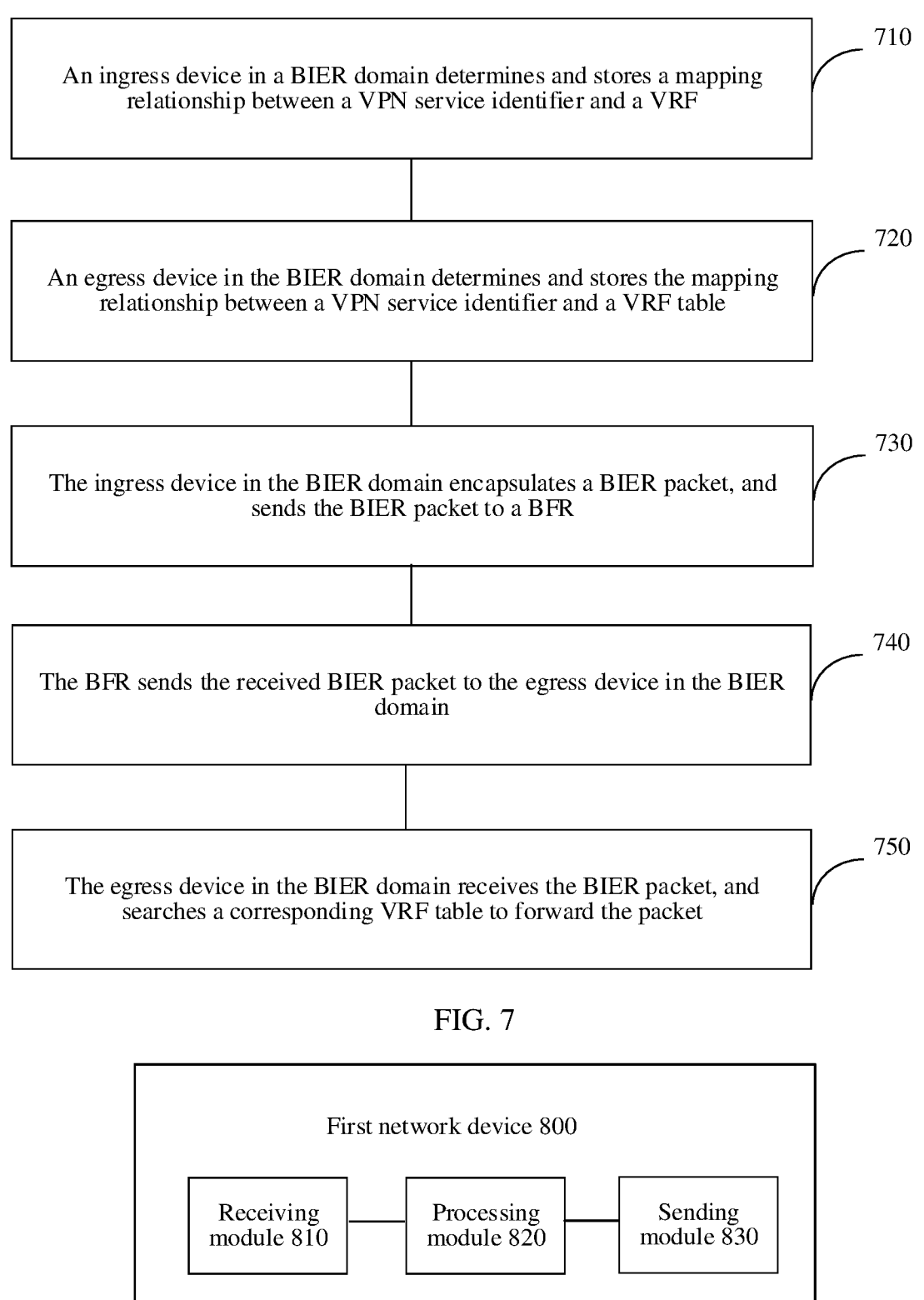

An ingress device in a BIER domain determines and stores a mapping relationship between a VPN service identifier and a VRF                710

An egress device in the BIER domain determines and stores the mapping relationship between a VPN service identifier and a VRF table                720

The ingress device in the BIER domain encapsulates a BIER packet, and sends the BIER packet to a BFR                730

The BFR sends the received BIER packet to the egress device in the BIER domain                740

The egress device in the BIER domain receives the BIER packet, and searches a corresponding VRF table to forward the packet                750

FIG. 7

First network device 800

| Receiving module 810 | Processing module 820 | Sending module 830 |

FIG. 8

BIER PACKET FORWARDING METHOD, DEVICE, AND SYSTEM

CROSS-REFERENCE TO RELATED APPLICATIONS

This application is a continuation of International Application No. PCT/CN2021/129377, filed on Nov. 8, 2021, which claims priority to Chinese Patent Application No. 202011250272.9, filed on Nov. 11, 2020. The disclosures of the aforementioned applications are hereby incorporated by reference in their entireties.

TECHNICAL FIELD

This application relates to the network communications field, and more specifically, to a packet forwarding method, a device, and a system.

BACKGROUND

An internet protocol (IP) multicast technology implements efficient point-to-multipoint data transmission in an IP network, so that a network bandwidth can be effectively reduced, and network load can be reduced. Therefore, a new technology for constructing a multicast packet forwarding path is proposed in the industry, and is referred to as a bit index explicit replication (BIER) technology. This technology proposes a new multicast technology architecture that does not need to construct a multicast distribution tree.

After receiving a BIER packet, an egress device in a BIER domain needs to determine a virtual private network (VPN) instance to which a multicast packet belongs, determines, based on the VPN instance, a virtual route forwarding (VRF) table corresponding to the VPN instance, and forwards the multicast packet to a next hop in the VRF table based on information in an original multicast packet (for example, a destination address in the original multicast packet) and the VRF table.

In a related technical solution, a service identifier (identifying a VPN instance) is carried in an MPLS label. Because a BIER packet includes one MPLS label layer, network-wide MPLS removal cannot be implemented, which is more complex for a device.

In another related technical solution, different VPN instances are identified by using different source addresses (SA) in an outer internet protocol version 6 (IPv6) header. When a VPN instance is identified by using a source IPv6 address, the source IPv6 address required for identifying the VPN instance needs to be managed and allocated.

SUMMARY

This application provides a BIER packet forwarding method, a device, and a system, so that implementation can be relatively simple when an egress edge device identifies a VPN instance.

According to a first aspect, a packet forwarding method is provided. The method includes: A first network device receives a BIER packet sent by a second network device, where the BIER packet includes an internet protocol version 6 IPv6 header, a bit index explicit replication BIER header, and a multicast packet, a destination address of the IPv6 header or a first field of the BIER header carries a service identifier, and the service identifier identifies a virtual private network VPN instance. The first network device determines a virtual route forwarding VRF table based on the service identifier and a first correspondence, where the first correspondence includes a correspondence between the service identifier and the VRF table. The first network device sends the multicast packet to a first customer edge CE device in the VRF table based on the VRF table.

In the foregoing technical solution, the destination address of the IPv6 header or the first field of the BIER header of the BIER packet carries the service identifier, so that a source IPv6 address required for identifying the VPN instance may not need to be managed and allocated, and an additional MPLS label layer does not need to be added either. Therefore, implementation is relatively simple, and device implementation complexity is reduced.

In a possible implementation, the service identifier is carried in a part of bits of the destination address of the IPv6 header, and the destination address indicates to perform BIER forwarding on the BIER packet.

In another possible implementation, the part of bits of the destination address is an argument part of the destination address.

In another possible implementation, the first field of the BIER header is any one or a combination of the following fields: a differentiated services code point DSCP field, a bit forwarding ingress router identifier BFIR-id field, and a protocol proto field.

In another possible implementation, the method further includes: The first network device receives a control packet, where the control packet includes the correspondence between the service identifier and the VRF table. The first network device stores the correspondence between the service identifier and the VRF table.

In another possible implementation, the first network device determines the VRF table based on the source address of the IPv6 header, the service identifier, and the first correspondence.

According to a second aspect, a BIER packet forwarding method is provided. The method includes: A second network device obtains a multicast packet. The second network device encapsulates the multicast packet based on a virtual private network VPN instance to which the multicast packet belongs, to obtain a BIER packet, where the BIER packet includes an internet protocol version 6 IPv6 header, a bit index explicit replication BIER header, and the multicast packet, a destination address of the IPv6 header or a first field of the BIER header carries a service identifier, and the service identifier identifies the VPN instance. The second network device sends the BIER packet to a first network device.

In another possible implementation, the service identifier is carried in a part of bits of the destination address of the IPv6 header, and the destination address indicates the first network device to perform BIER forwarding on the BIER packet.

In another possible implementation, the part of bits of the destination address is an argument part of the destination address.

In another possible implementation, the first field of the BIER header is any one or a combination of the following fields: a differentiated services code point DSCP field, a bit forwarding ingress router identifier BFIR-id field, and a protocol proto field.

In another possible implementation, the method further includes: The second network device allocates the service identifier to the VPN instance. The second network device establishes a first correspondence, where the first correspondence includes a correspondence between the service identifier and a VRF table corresponding to the VPN instance.

In another possible implementation, the method further includes: The second network device sends a control packet to the first network device, where the control packet includes the correspondence between the service identifier and the VRF table.

In another possible implementation, the control packet is a border gateway protocol BGP packet.

Beneficial effects of any one of the second aspect and the possible implementations of the second aspect correspond to beneficial effects of any one of the first aspect and the possible implementations of the first aspect. Details are not described herein again.

According to a third aspect, a first network device is provided, including a receiving module, a processing module, and a sending module.

The receiving module is configured to receive a BIER packet sent by a second network device, where the BIER packet includes an internet protocol version 6 IPv6 header, a bit index explicit replication BIER header, and a multicast packet, a destination address of the IPv6 header or a first field of the BIER header carries a service identifier, and the service identifier identifies a virtual private network VPN instance.

The processing module is configured to determine a virtual route forwarding VRF table based on the service identifier and a first correspondence, where the first correspondence includes a correspondence between the service identifier and the VRF table.

The sending module is configured to send the multicast packet to a first customer edge CE device in the VRF table based on the VRF table.

In a possible implementation, the service identifier is carried in a part of bits of the destination address of the IPv6 header, and the destination address indicates to perform BIER forwarding on the BIER packet.

In another possible implementation, the part of bits of the destination address is an argument part of the destination address.

In another possible implementation, the first field of the BIER header is any one or a combination of the following fields: a differentiated services code point DSCP field, a bit forwarding ingress router identifier BFIR-id field, and a protocol proto field.

In another possible implementation, the receiving module is further configured to receive a control packet, where the control packet includes the correspondence between the service identifier and the VRF table; and the processing module is further configured to store the correspondence between the service identifier and the VRF table.

In another possible implementation, the first correspondence further includes a source address; and the processing module is specifically configured to determine the VRF table based on the source address of the IPv6 header, the service identifier, and the first correspondence.

According to a fourth aspect, a second network device is provided, including a receiving module, a processing module, and a sending module.

The receiving module is configured to obtain a multicast packet.

The processing module is configured to encapsulate the multicast packet based on a virtual private network VPN instance to which the multicast packet belongs, to obtain a BIER packet, where the BIER packet includes an internet protocol version 6 IPv6 header, a bit index explicit replication BIER header, and the multicast packet, a destination address of the IPv6 header or a first field of the BIER header carries a service identifier, and the service identifier identifies the VPN instance.

The sending module is configured to send the BIER packet to a first network device.

In a possible implementation, the service identifier is carried in a part of bits of the destination address of the IPv6 header, and the destination address indicates the first network device to perform BIER forwarding on the BIER packet.

In another possible implementation, the part of bits of the destination address is an argument part of the destination address.

In another possible implementation, the first field of the BIER header is any one or a combination of the following fields: a differentiated services code point DSCP field, a bit forwarding ingress router identifier BFIR-id field, and a protocol proto field.

In another possible implementation, the processing module is further configured to: allocate the service identifier to the VPN instance; and establish a first correspondence, where the first correspondence includes a correspondence between the service identifier and a VRF table corresponding to the VPN instance.

In another possible implementation, the sending module is further configured to send a control packet to the first network device, where the control packet includes the correspondence between the service identifier and the VRF table.

In another possible implementation, the control packet is a border gateway protocol BGP packet.

According to a fifth aspect, a first network device is provided. The first network device has functions of implementing behavior of the first network device in the foregoing method. The functions may be implemented based on hardware, or may be implemented based on hardware executing corresponding software. The hardware or the software includes one or more modules corresponding to the foregoing functions.

In a possible design, a structure of the first network device includes a processor and an interface. The processor is configured to support the first network device in performing a corresponding function in the foregoing method. The interface is configured to support the first network device in receiving a BIER packet sent by a second network device, or is configured to support the first network device in sending the multicast packet to a first customer edge CE device in the VRF table based on the VRF table.

The first network device may further include a memory. The memory may be coupled to the processor, and store program instructions and data that are necessary for the first network device.

In another possible design, the first network device includes a processor, a transmitter, a receiver, a random access memory, a read-only memory, and a bus. The processor is separately coupled to the transmitter, the receiver, the random access memory, and the read-only memory through the bus. When the first network device needs to run, a bootloader in a basic input/output system or an embedded system built into the read-only memory is used for booting a system to start, to boot the first network device to enter a normal running state. After entering the normal running state, the first network device runs an application and an operating system in the random access memory, so that the processor performs the method according to any one of the first aspect or the possible implementations of the first aspect.

According to a sixth aspect, a first network device is provided. The first network device includes a main control board and an interface board, and may further include a switching board. The first network device is configured to perform the method according to any one of the first aspect or the possible implementations of the first aspect. Specifically, the first network device includes modules configured to perform the method according to any one of the first aspect or the possible implementations of the first aspect.

According to a seventh aspect, a first network device is provided. The first network device includes a control module and a first forwarding subdevice. The first forwarding subdevice includes an interface board, and may further include a switching board. The first forwarding subdevice is configured to perform a function of the interface board in the sixth aspect, and may further perform a function of the switching board in the sixth aspect. The control module includes a receiver, a processor, a transmitter, a random access memory, a read-only memory, and a bus. The processor is separately coupled to the receiver, the transmitter, the random access memory, and the read-only memory through the bus. When the control module needs to run, a bootloader in a basic input/output system or an embedded system built into the read-only memory is used for booting a system to start, to boot the control module to enter a normal running state. After entering the normal running state, the control module runs an application and an operating system in the random access memory, so that the processor performs a function of the main control board in the sixth aspect.

It can be understood that the first network device may include any quantity of interfaces, processors, or memories during actual application.

According to an eighth aspect, a second network device is provided. The second network device has functions of implementing behavior of the second network device in the foregoing method. The functions may be implemented based on hardware, or may be implemented based on hardware executing corresponding software. The hardware or the software includes one or more modules corresponding to the foregoing functions.

In a possible design, a structure of the second network device includes a processor and an interface. The processor is configured to support the second network device in performing a corresponding function in the foregoing method. The interface is configured to support the second network device in obtaining a multicast packet, or is configured to support the second network device in sending the BIER packet to a first network device.

The second network device may further include a memory. The memory may be coupled to the processor, and store program instructions and data that are necessary for the second network device.

In another possible design, the second network device includes a processor, a transmitter, a receiver, a random access memory, a read-only memory, and a bus. The processor is separately coupled to the transmitter, the receiver, the random access memory, and the read-only memory through the bus. When the second network device needs to run, a bootloader in a basic input/output system or an embedded system built into the read-only memory is used for booting a system to start, to boot the second network device to enter a normal running state. After entering the normal running state, the second network device runs an application and an operating system in the random access memory, so that the processor performs the method according to any one of the second aspect or the possible implementations of the second aspect.

According to a ninth aspect, a second network device is provided. The second network device includes a main control board and an interface board, and may further include a switching board. The second network device is configured to perform the method according to any one of the second aspect or the possible implementations of the second aspect. Specifically, the second network device includes modules configured to perform the method according to any one of the second aspect or the possible implementations of the second aspect.

According to a tenth aspect, a second network device is provided. The second network device includes a control module and a first forwarding subdevice. The first forwarding subdevice includes an interface board, and may further include a switching board. The first forwarding subdevice is configured to perform a function of the interface board in the ninth aspect, and may further perform a function of the switching board in the ninth aspect. The control module includes a receiver, a processor, a transmitter, a random access memory, a read-only memory, and a bus. The processor is separately coupled to the receiver, the transmitter, the random access memory, and the read-only memory through the bus. When the control module needs to run, a bootloader in a basic input/output system or an embedded system built into the read-only memory is used for booting a system to start, to boot the control module to enter a normal running state. After entering the normal running state, the control module runs an application and an operating system in the random access memory, so that the processor performs a function of the main control board in the ninth aspect.

It can be understood that the second network device may include any quantity of interfaces, processors, or memories during actual application.

According to an eleventh aspect, a computer program product is provided. The computer program product includes computer program code. When the computer program code is run on a computer, the computer is enabled to perform the method according to any one of the first aspect or the possible implementations of the first aspect.

According to a twelfth aspect, a computer program product is provided. The computer program product includes computer program code. When the computer program code is run on a computer, the computer is enabled to perform the method according to any one of the second aspect or the possible implementations of the second aspect.

According to a thirteenth aspect, a computer-readable medium is provided. The computer-readable medium stores program code. When the computer program code is run on a computer, the computer is enabled to perform the method according to any one of the first aspect or the possible implementations of the first aspect. The computer-readable medium includes but is not limited to one or more of the following: a read-only memory (ROM), a programmable ROM (PROM), an erasable PROM (EPROM), a flash memory, an electrically EPROM (EEPROM), and a hard drive.

According to a fourteenth aspect, a computer-readable medium is provided. The computer-readable medium stores program code. When the computer program code is run on a computer, the computer is enabled to perform the method according to any one of the second aspect or the possible implementations of the second aspect. The computer-readable medium includes but is not limited to one or more of the following: a read-only memory (ROM), a programmable ROM (PROM), an erasable PROM (EPROM), a flash memory, an electrically EPROM (EEPROM), and a hard drive.

According to a fifteenth aspect, a chip is provided. The chip includes a processor and a data interface, and the processor reads, through the data interface, instructions stored in a memory, to perform the method according to any one of the first aspect or the possible implementations of the first aspect. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

According to a sixteenth aspect, a chip is provided. The chip includes a processor and a data interface, and the processor reads, through the data interface, instructions stored in a memory, to perform the method according to any one of the second aspect or the possible implementations of the second aspect. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

According to a seventeenth aspect, a system is provided. The system includes the first network device and the second network device above.

BRIEF DESCRIPTION OF THE DRAWINGS

FIG. 3 is a schematic diagram of a possible BIER header format according to an embodiment of this application;

FIG. 4 is a schematic block diagram of another possible BIER header format;

FIG. 6 is a schematic flowchart of a BIER packet forwarding method according to an embodiment of this application;

FIG. 7 is a schematic flowchart of another BIER packet forwarding method according to an embodiment of this application;

FIG. 8 is a schematic diagram of a structure of a first network device 800 according to an embodiment of this application;

8

Figure 13:
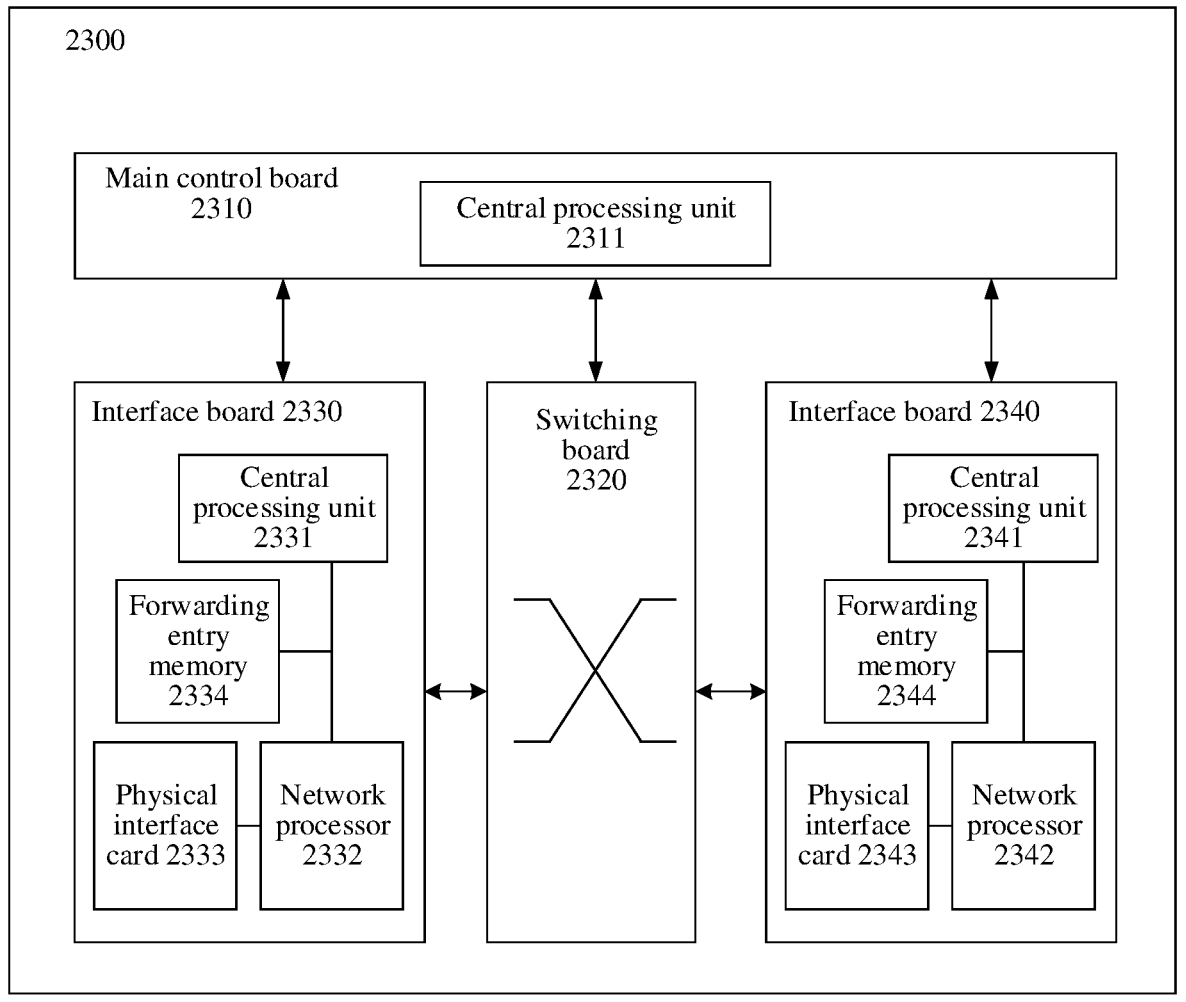

FIG. 13 is a schematic diagram of a hardware structure of another second network device 2300 according to an embodiment of this application.

DETAILED DESCRIPTION OF ILLUSTRATIVE EMBODIMENTS

The following describes technical solutions of this application with reference to accompanying drawings.

All aspects, embodiments, or features are presented in this application based on a system that includes a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be further used.

In addition, in embodiments of this application, terms such as "for example" and "such as" represent giving an example, an illustration, or a description. Any embodiment or design scheme described as an "example" in this application should not be explained as being more preferred or having more advantages than another embodiment or design scheme. Specifically, the term "example" presents a concept in a specific manner.

In embodiments of this application, "relevant" and "corresponding" sometimes may be interchanged. It should be noted that meanings expressed by the terms are consistent when differences are not emphasized.

A network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. Terms "include", "have", and variants thereof all mean "include but are not limited to", unless otherwise specifically emphasized in another manner.

In this application, "at least one" means one or more, and "a plurality of" means two or more. In addition, "and/or" describes an association relationship between associated objects and represents that three relationships may exist. For example, A and/or B may represent the following three cases: Only A exists, both A and B exist, and only B exists, where A and B may be singular or plural. A character "/" generally indicates an "or" relationship between the associated objects. In addition, "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Multicast is a data transmission mode in which data is efficiently sent to a plurality of receivers in a transmission control protocol (TCP)/internet protocol (IP) network at a same time by using one multicast address. A multicast source sends multicast traffic to multicast group members in a multicast group through links in a network, and each multicast group member in the multicast group can receive the multicast traffic. A multicast transmission mode implements a point-to-multipoint data connection between the multicast source and the multicast group members. The multicast traffic needs to be transmitted only once on each network link, and multicast replication is performed only when there is a branch on the link. Therefore, the multicast transmission mode improves data transmission efficiency and reduces a possibility of congestion on a backbone network.

An internet protocol (IP) multicast technology implements efficient point-to-multipoint data transmission in an IP network, so that a network bandwidth can be effectively reduced, and network load can be reduced. Therefore, the IP multicast technology is widely used in various aspects such as real-time data transmission, multimedia conferences, data copy, internet protocol television (IPTV), games, and simulation. In the multicast technology, a multicast tree is constructed on a control plane by using a multicast protocol, and then logic on a network plane is made to be tree-shaped by using the multicast tree, to implement multicast point-to-multipoint data forwarding. Each intermediate device using construction of a distribution tree as a core needs to maintain a complex multicast forwarding information status. As a network scale expands and traffic of a multicast packet increases, this multicast technology faces increasingly high costs and operation and maintenance challenges.

Figure 1:
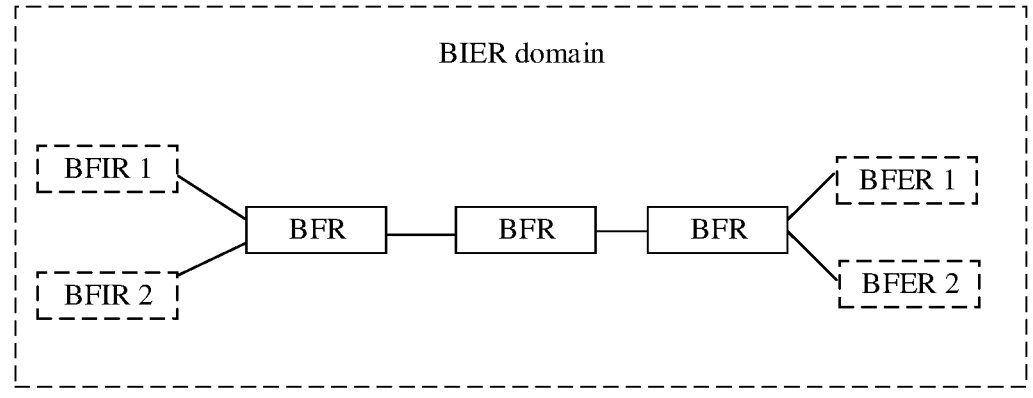
FIG. 1 is a schematic networking diagram of a BIER technology according to an embodiment of this application.

Therefore, a new technology for constructing a multicast packet forwarding path is proposed in the industry, and is referred to as a bit index explicit replication (BIER) technology. This technology proposes a multicast technology architecture that does not need to construct a multicast distribution tree. As shown in FIG. 1, a router that supports the BIER technology is referred to as a bit forwarding router (BFR). A BFR that performs BIER encapsulation on a user multicast packet is referred to as a bit forwarding ingress router (BFIR). A BFR that obtains a user multicast packet from a BIER packet through decapsulation is referred to as a bit forwarding egress router (BFER). A multicast forwarding domain formed by one or more BFIRs, one or more BFRs, and one or more BFERs is referred to as a BIER domain. The BFIR is located at an ingress of the BIER domain, and is responsible for encapsulating the BIER packet as an ingress node that forwards the BIER packet. The BFR is located in the middle of the BIER domain, and is responsible for forwarding the BIER packet as an intermediate node that forwards the BIER packet. The BFER is located at an egress of the BIER domain, and is responsible for decapsulating the BIER packet as an egress node that forwards the BIER packet.

It should be understood that the BFIR and the BFER in the BIER domain may also be referred to as edge BFRs in the BIER domain.

For ease of understanding, the following describes in detail a related BIER technology with reference to FIG. 2 to FIG. 5.

In the BIER domain, a globally unique bit position identifier in an entire BIER sub-domain (SD) may be configured for the edge BFR. In an example, a value is configured for each edge BFR as a BFR identifier (BFR ID).

For example, the BFR ID may be a value ranging from 1 to 256. All BFR IDs in the BIER domain form a bit string.

In this embodiment of this application, when an original multicast packet is transmitted in the BIER domain, a specific BIER header needs to be additionally encapsulated. In the BIER header, all destination devices of the original multicast packet are marked by using a bit string. The BFR in the BIER domain can perform forwarding based on a bit index forwarding table (BIFT) and the bit string carried in the BIER header, to ensure that the original multicast packet can be sent to all destination addresses.

It should be understood that the original multicast packet following the BIER header may be an internet protocol version 6 (IPv6) multicast packet, or may be an internet protocol version 4 (IPv4) multicast packet. This is not specifically limited in this application.

There may be various types of BIER encapsulation. This is not specifically limited in this application. In an example, a BIER packet may be encapsulated through multiprotocol label switching (MPLS), and this type of encapsulation may be referred to as BIER-MPLS encapsulation. In another example, a BIER packet may be encapsulated based on the internet protocol version 6 (IPv6), and this type of encapsulation may be referred to as BIERv6 encapsulation.

Figure 2:
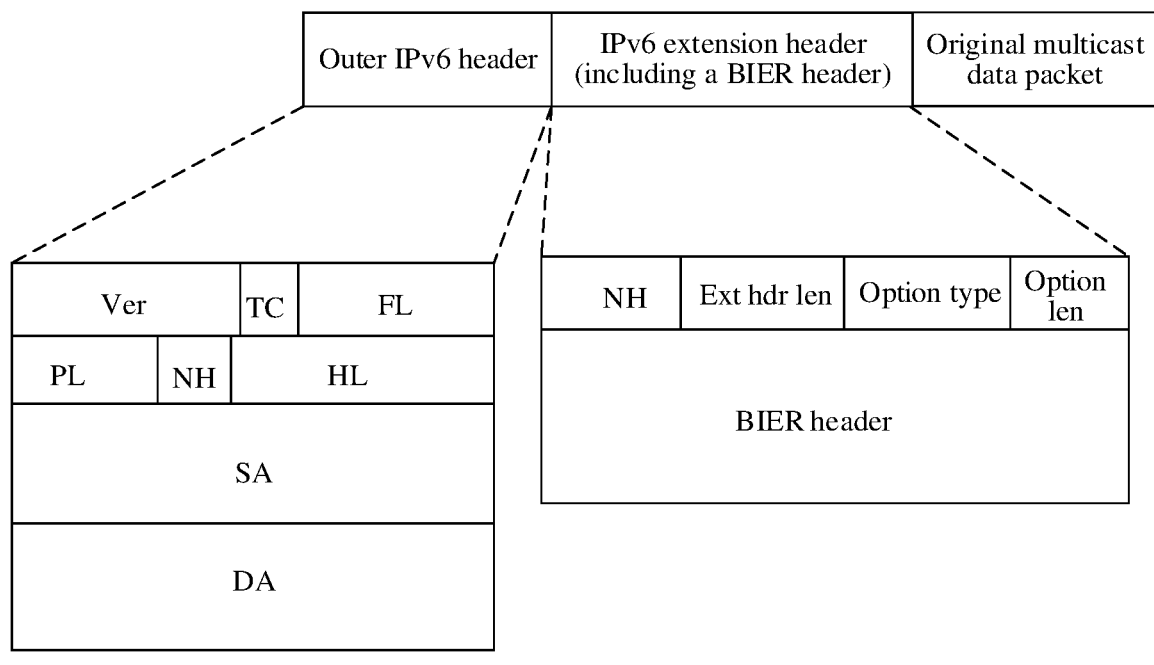
FIG. 2 is a schematic diagram of a possible packet format in BIERv6 encapsulation according to an embodiment of this application.

The following describes in detail a related BIERv6 encapsulation technology with reference to FIG. 2.

For example, a packet format in BIERv6 encapsulation is: IPv6 header+BIER header+original multicast packet. The BIER header may be included in an IPv6 extension header, and the original multicast packet is used as a payload of an outer IPv6 header.

In this encapsulation, the IPv6 header and the IPv6 extension header including the BIER header jointly form an outer packet header of an inner original multicast packet, and the outer packet header may also be referred to as a BIERv6 header in embodiments of this application.

The IPv6 extension header including the BIER header is not specifically limited in embodiments of this application. For example, the IPv6 extension header may be a destination options header (DOH). For another example, the IPv6 extension header may be a routing header (RH).

FIG. 2 is a schematic block diagram of possible BIERv6 encapsulation. As shown in FIG. 2, the BIER header may be located in the IPv6 extension header, for example, located in the DOH.

It should be understood that an option in the DOH is a type-length-value (TLV) format. The BIER header is used as option data in an option TLV in the DOH. An option type in the option TLV identifies a format of the option TLV. An option length in the option TLV identifies a length of the option TLV.

It should be noted that, in BIERv6 encapsulation, a format of the BIER header in the DOH is not specifically limited in this embodiment of this application, provided that the BIER header includes a bit string field. The following describes in detail two possible BIER header formats with reference to FIG. 3 and FIG. 4 respectively.

FIG. 3 is a schematic block diagram of a possible BIER header format. As shown in FIG. 3, the BIER header may include but is not limited to a bit index forwarding table identifier (BIFT ID) with a length of 20 bits, a bit string length (BSL), and another field with a length of 64 bits (8 bytes), for example, a traffic class (TC) of an original multicast packet following the BIER header, a stack (S), a time to live (TTL) field, an entropy field, a version (Ver) field, a nibble field, a protocol (proto) field, an operation administration and maintenance (OAM) field, a reserved (Rsv) field, and a differentiated services code point (DSCP) field.

The fields in the BIER header are separately described below in detail.

(1) BIFT ID Field

The BIFT ID field has a length of 20 bits, and is a multiprotocol label switching (MPLS) label (L) in BIER-MPLS encapsulation. The MPLS label may be referred to as a BIER label. Fields such as the TC/S/TTL field following the BIER label have a standard label coding format. The fields such as the TC/S/TTL field are separately described below, and details are not described herein.

A BIFT ID may be a BIFT-id, and may include a combination of a sub-domain (SD)/a bit string length (BSL)/a set identifier (SI). Different BIFT IDs may correspond to different combinations of SDs/BSLs/SIs.

It should be understood that different BIFT IDs may be mapped to different combinations of SDs/BSLs/SIs. The BIER header format shown in FIG. 2 does not directly include an SD/BSL/SI field. The SD field, the BSL field, and the SI field are three implicit fields, and an SD/BSL/SI value needs to be obtained through mapping based on the BIFT ID field.

1. Sub-Domain (SD)

One BIER domain may be divided into different subdomains SDs and the sub-domains SDs are configured according to a requirement of an actual service scenario, to support a multi-topology feature and the like of an interior gateway protocol (IGP). Each BIER domain needs to include at least one sub-domain, that is, a default subdomain 0. When the BIER domain is divided into a plurality of sub-domains, all the sub-domains need to be configured for each BFR router in the BIER domain. For example, for each BFR router in the BIER domain, a sub-domain 0 may be configured and a default topology in a system is used, and then a sub-domain 1 may be configured and a multicast topology is used.

Each sub-domain SD is represented by a sub-domain identifier (SD-ID). For example, a value of the SD-ID is [0-255], and a length of the SD-ID is 8 bits. In an example, the BIER domain may be configured into different SDs based on different virtual private networks (VPN), and different VPNs are configured to use different SDs. For example, a VPN 1 uses an SD 0, and a VPN 2 uses an SD 1.

It should be noted that a plurality of VPNs may alternatively use a same SD. Different SDs in the BIER domain may be in one interior gateway protocol (IGP) process or topology, or may not be in one IGP process or topology. This is not specifically limited in embodiments of this application.

2. Bit String Length (BSL)

The BSL is a length of a bit string included in the BIER header. There may be various types of BSLs. This is not specifically limited in embodiments of this application. A smallest BSL is 64 bits. The BSL may alternatively be 128 bits, 256 bits, 512 bits, 1024 bits, or 2048 bits. A largest BSL is 4096 bits. Specifically, the BSL is identified in a packet by 4 bits. For example, when the BSL is 64 bits, the BSL is identified in the packet by 0001; when the BSL is 128 bits, the BSL is identified in the packet by 0010; when the BSL is 512 bits, the BSL is identified in the packet by 0100; when the BSL is 1024 bits, the BSL is identified in the packet by 0101; and so on.

3. Set Identifier (SI)

If a quantity of BFER devices in a network is greater than 256, to adapt to this case, BIER encapsulation includes not only a bit string, but also a set identifier (SI). The SI is used for dividing numbers of BIER devices into a plurality of different intervals, to support larger-scale network addressing.

The SI may be understood as a set including a plurality of edge BFRs in a network or including configured BFR IDs. In an example, the BSL is 256 bits, but there are more than 256 edge BFRs in the network, or there are more than 256 configured BFR IDs. In this case, these edge BFRs or BFR IDs need to be classified into different sets. For example, 256 edge BFRs whose BFR IDs range from 1 to 256 are a set 0 (whose set index is 0 or SI is 0), and 256 edge BFRs whose BFR IDs range from 257 to 512 are a set 1 (whose set index is 1 or SI is 1).

After receiving a BIER packet, a BFR in the BIER domain may determine, based on a BIFT ID in a BIER header, a specific SD to which the BIER packet belongs, a used BSL, and a specific SI that constitutes a set and that is of the BSL to which the packet belongs.

Corresponding combinations of SDs/BSLs/SIs represented by several possible BIFT IDs are enumerated below:

BIFT ID=1: corresponding to SD 0, BSL 256, SI 0//equivalent to SD 0/BSL 256/SI 0;

BIFT ID=2: corresponding to SD 0, BSL 256, SI 1//equivalent to SD 0/BSL 256/SI 1;

BIFT ID=3: corresponding to SD 0, BSL 256, SI 2//equivalent to SD 0/BSL 256/SI 2;

BIFT ID=4: corresponding to SD 0, BSL 256, SI 3//equivalent to SD 0/BSL 256/SI 3;

BIFT ID=5: corresponding to SD 0, BSL 512, SI 0//equivalent to SD 0/BSL 512/SI 0;

BIFT ID=6: corresponding to SD 0, BSL 512, SI 1//equivalent to SD 0/BSL 512/SI 1;

BIFT ID=7: corresponding to SD 1, BSL 256, SI 0//equivalent to SD 1/BSL 256/SI 0;

BIFT ID=8: corresponding to SD 1, BSL 256, SI 1//equivalent to SD 1/BSL 256/SI 1;

BIFT ID=9: corresponding to SD 1, BSL 256, SI 2//equivalent to SD 1/BSL 256/SI 2;

BIFT ID=10: corresponding to SD 1, BSL 256, SI 3//equivalent to SD 1/BSL 256/SI 3;

BIFT ID=11: corresponding to SD 1, BSL 512, SI 0//equivalent to SD 1/BSL 512/SI 0; and BIFT ID=12: corresponding to SD 1, BSL 512, SI 1//equivalent to SD 1/BSL 512/SI 1.

It should be noted that a value of the BIFT ID field corresponds to a triplet <SD, BSL, SI>. Unique <SD, BSL, SI> information can be obtained based on the BIFT-id field. The <SD, BSL, SI> information has the following functions: A length of a bit string in the BIER packet header is obtained based on the BSL, to learn of a length of the entire BIER packet header. Whether the bit string represents BFR-IDs ranging from 1 to 256 or BFR-IDs ranging from 257 to 512 can be learned based on BSL and SI information. A corresponding forwarding table can be found based on the information about the SD.

(2) Bit String Field

Each bit in the bit string identifies an edge BFR. For example, a bit in lower bits (rightmost) in the bit string identifies a BFER whose BFR-ID is 1. The second bit from right to left in the bit string identifies a BFER whose BFR-ID is 2. For a forwarding entry on which forwarding performed by a forwarding plane is based, several specific BFERs to which a packet is to be sent are determined based on a bit string in the packet. When receiving a BIER packet including the BIER packet header, the BFR in the BIER domain forwards the BIER packet based on a bit string and a BIFT ID that are carried in the BIER header.

It should be noted that a value 1 of the bit indicates that the packet needs to be sent to a BFER device represented by the BFR-ID, and a value 0 of the bit indicates that the packet does not need to be sent to the BFER device represented by the BFR-ID.

For example, BIFT ID=2. After receiving the BIER packet, the BFR may learn, based on the BIFT ID in the BIER header, that the BIER packet belongs to the SD 0, a BSL used in the BIER header is 256 bits, and the BFR ID belongs to the set 1 (a set including 256 edge BFRs whose BFR IDs range from 257 to 512).

(3) Transmission Class ( ) Field

The traffic class field identifies a priority of a packet.

(4) Stack (S)

S is a stack bottom flag. A value of the flag is 1 in the BIER packet header. In other words, the MPLS label is a stack bottom label of an entire label stack.

(5) Version (Ver) Field

The version field has a length of 4 bits, and is an IP version number. A value 4 represents IPv4, and a value 6 represents IPv6.

(6) Entropy Field

The entropy field is used for load sharing. Equivalent load sharing may be performed during BIER forwarding. In this case, during load sharing, a same path needs to be selected for two BIER packets with same entropy and a same bit string. In other words, a plurality of packets of same traffic have same entropy, and a plurality of packets of different traffic have different entropy. When a packet is forwarded, different traffic may be shared on different links based on entropy, and a plurality of packets of same traffic pass through a same link.

To ensure that different entropy identifies different traffic, when allocating entropy, a BFIR device needs to allocate different entropy labels based on the different traffic, and the entropy cannot be repeated.

(7) Protocol (Proto) Field

The protocol field identifies a payload format following the BIER packet header. For example, a value 4 and a value 6 respectively represent an IPv4 packet and an IPv6 packet. A value 2 represents an MPLS packet with an upstream allocated label, and is a proto value used in a multicast virtual private network (MVPN) over BIER. A reason for using an upstream label is as follows: Multicast is point-to-multipoint sending. A provider edge (PE) device at a transmitting end may allocate a unique label, and send the unique label to a PE device at a receiving end on a control plane. The label allocated by the PE device at the transmitting end is used in a data packet, and is identified by the PE device at the receiving end. The label is not allocated by the PE device at the receiving end, but allocated by the PE device at the transmitting end, and therefore is referred to as an upstream label.

(8) Nibble

The nibble field has a fixed 4-bit value 0101. This field is used for distinguishing between services carried through MPLS, and distinguishing between BIER, IPv4, and IPv6. This is because an IPv4 or IPv6 header following a label stack is sometimes checked to support ECMP during MPLS encapsulation and forwarding.

(9) BFIR-Id

The BFIR-id field indicates a BFR-ID of a BFIR. If the BFIR device encapsulates and sends a BIER packet in a sub-domain, the BFIR-id field needs to be filled with the BFR-ID of the device in the sub-domain. The BFIR-id may identify a specific BFIR from which a multicast flow is sent, to uniquely determine the multicast flow.

(10) Bit String

The bit string field indicates a character string of a destination device set of a BIER packet.

FIG. 4 is a schematic block diagram of another possible BIER header format. Compared with the BIER header format shown in FIG. 3, the BIER header format shown in FIG. 4 does not include the BIFT-ID field, but includes three fields: the SD field, the BSL field, and the SI field. In other words, the BIER header format shown in FIG. 4 directly includes the three fields: the SD field, the BSL field, and the SI field, and the SD/BSL/SI value does not need to be obtained through mapping from the BIFT ID field.

It should be noted that fields included in the BIER header format shown in FIG. 3 are similar to the fields included in the BIER header format shown in FIG. 2. For specific descriptions related to the fields in the BIER header format shown in FIG. 3, refer to the descriptions in FIG. 2. Details are not described herein again.

Fields included in the outer IPv6 header are described below in detail.

Version (Ver) field: The version field is an IP version number, and a value 6 of the version field represents IPv6.

Traffic class (TC) field: The traffic class field identifies a priority of a packet.

Flow label (FL) field: A same flow label may be used for labeling a plurality of packets of same traffic, and another flow label value is used for labeling a plurality of packets of different traffic. When a packet is forwarded, different traffic may be shared on different links based on a flow label, and a plurality of packets of same traffic pass through a same link. In other words, the flow label is used for distinguishing between real-time traffic, and different flow labels may determine different data flows. In this way, a network device in the BIER domain can more efficiently distinguish between different data flows based on the flow label field.

Payload length (PL) field: The payload length field indicates a length of a packet.

Next header (NH) field: The next header field indicates a type of a next header of a packet, for example, may represent an IPv6 extension header.

Hop limit (HL) field: The hop limit field indicates a limit on a quantity of packets.

Source address (SA) field: The source address field identifies a source address of a packet.

Destination address (DA) field: The destination address field identifies a destination address of a packet.

Figure 5:
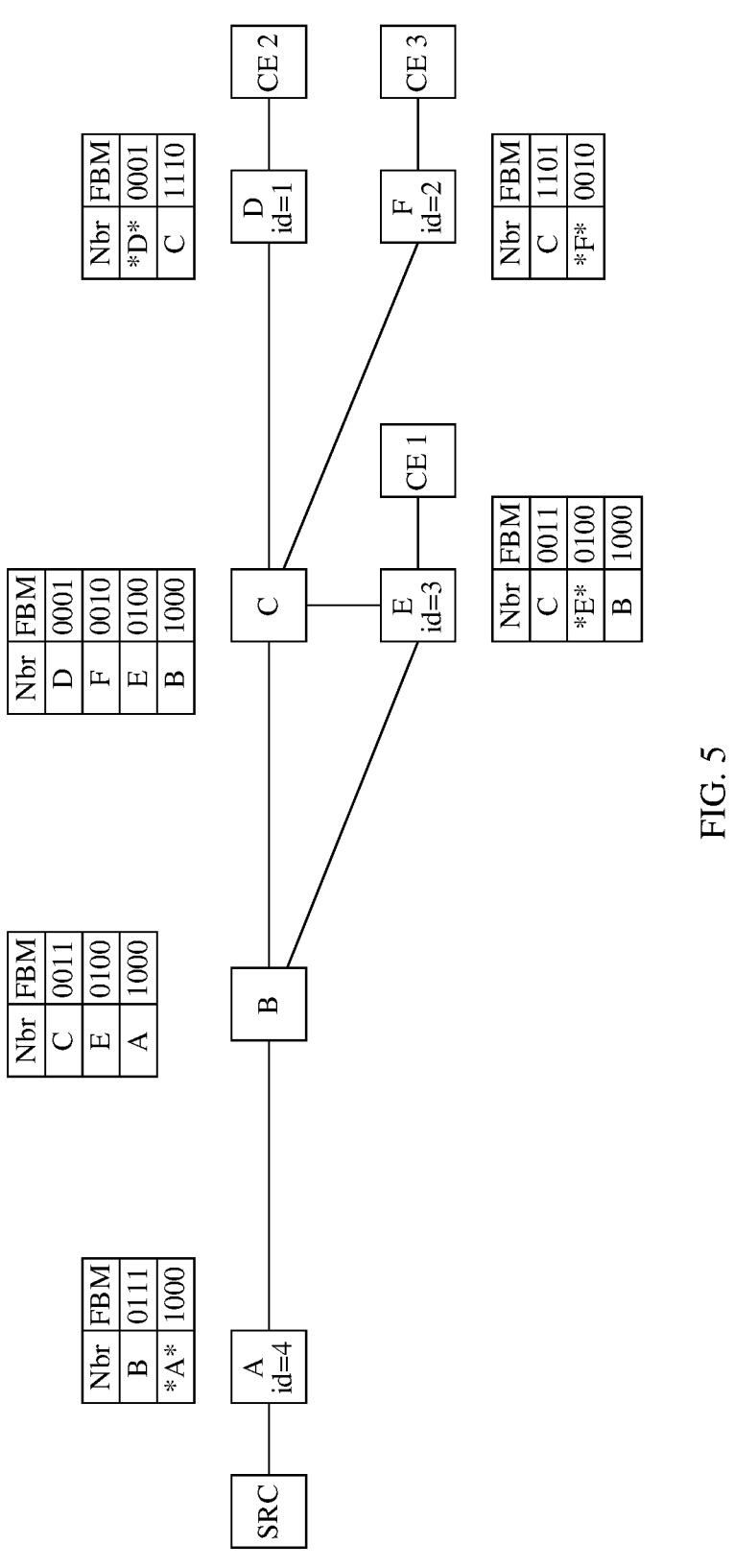
FIG. 5 shows a process of establishing a BIER forwarding table and forwarding a BIERv6 packet based on a BIER technology.

The following uses FIG. 5 as an example to describe in detail a process of establishing a BIER forwarding table and forwarding a BIER packet based on a BIER technology.

A BIER domain shown in FIG. 5 may include a device A to a device F. The device A, the device D, the device E, and the device F are edge BFRs in the BIER domain, and the device B and the device C are BIER intermediate forwarding devices. Specifically, the device A is located at an ingress of the BIER domain, is responsible for performing BIER encapsulation on an original multicast packet, and corresponds to the BFIR in FIG. 1. The device D, the device E, and the device F are located at an egress of the BIER domain, are responsible for obtaining the original multicast packet from the BIER packet through decapsulation, and correspond to the BFIRs in FIG. 1.

In this embodiment of this application, a unique BFR-ID may be allocated to an edge BFR in each BIER domain. For example, in FIG. 5, BFR-IDs configured for the device A, the device D, the device E, and the device F are respectively 4, 1, 3, and 2. No BFR-ID is allocated to the intermediate forwarding BFRs, for example, the device B and the device C.

It should be noted that, in embodiments of this application, "ID" and "id" sometimes may be interchanged. It should be noted that meanings expressed by the terms are consistent when differences are not emphasized. The BFR-ID in this application may mean the id in FIG. 5.

When functioning as an ingress of an IPv6 network, after receiving a user multicast packet from a multicast source (SRC), the device A encapsulates the user multicast packet into a BIERv6 header, that is, into an outer IPv6 header and an IPv6 extension header including the BIER header, to obtain an encapsulated BIERv6 packet. The BIER packet header included in the IPv6 extension header carries a bit string representing a set of destination devices.

In the BIER header, all destination devices of the traffic are marked by using an encapsulated bit string. For example, a bit string corresponding to the device D whose BFR-ID is 1 is 0001, a bit string corresponding to the device F whose BFR-ID is 2 is 0010, a bit string corresponding to the device E whose BFR-ID is 3 is 0100, and a bit string corresponding to the device A whose BFR-ID is 4 is 1000.

It should be understood that a BFR-ID value allocated to each edge BFR in the BIER domain may be flooded to another BFR in the BIER domain according to a routing protocol. Flooded BIER information further includes an IP address and encapsulation information of the edge BFR. For example, flooded BIER information of the device A carries an IP address and a BIFT-id of the device A. A BFR (for example, the device F in FIG. 5) in the BIER domain may establish a BIFT entry based on the flooded BIER information, so that the device F in FIG. 5 forwards the BIER packet to the destination device based on the established BIFT entry after receiving the BIER packet.

If the device A needs to send a BIER packet to BFERs whose BFR-IDs are respectively 1, 2, and 3, the device A needs to first send the BIER packet to a neighbor (the device B) of the device A. An edge BFR whose BFR-ID is 4 is the device A. Therefore, a BIFT entry established by the device A is as follows:

forwarding entry 1: neighbor (Nbr)=B, and forwarding bit mask (FBM)=0111; and
   forwarding entry 2: Nbr*=A, and FBM=1000.

The forwarding entry 1 indicates that, when any one of the first bit, the second bit, and the third bit from right to left of a bit string in the BIER packet is 1, the BIER packet is sent to the neighbor (the device B) of the device A, where Nbr=B indicates that the neighbor of the device A is the device B.

The forwarding entry 2 indicates that, when the fourth bit from right to left of the bit string in the BIER packet is 1, the BIER packet is sent to the device A. Because the device A is the device A, the device A removes the BIER header and performs forwarding based on the information in the original multicast packet. It should be noted that, in the forwarding entry 2, * identifies that Nbr of a device is the device. For example, for the device A, Nbr*=A indicates that the neighboring device of the device A is the device A. Similarly, the other devices in FIG. 5 may also establish BIFT entries based on neighboring devices of the other devices. For the BIFT entries established by the other devices, refer to FIG. 5. Details are not described herein again.

After receiving the original multicast packet, the device A used as the ingress BFIR in the BIER domain encapsulates the BIER header before the original multicast packet. It should be understood that, for ease of description, the device A is referred to as an ingress device A for short below. In an example, after receiving the original multicast packet, the ingress device A may learn a destination device of the original multicast packet based on a BFR-ID flooded by using a border gateway protocol BGP message.

For example, a receiver of the original multicast packet is a destination device E whose BFR-ID is 3, a destination device F whose BFR-ID is 2, and a destination device D whose BFR-ID is 1. The ingress device A encapsulates the bit string of the BIER header as 0111, and forwards the encapsulated BIER packet to the neighboring device B based on the forwarding entry 1. During sending, a unicast address (for example, B::100) of the device B may be used in a destination address field in the IPv6 header.

After receiving the BIER packet, the device B determines, based on the bit string 0111 and the BIFT entry, that the BIER packet needs to be sent to the device C and the device E. For example, when sending the BIER packet to the device C, the device B may perform an AND operation on the bit string (0111) in the BIER header and an FBM field corresponding to Nbr=C in the BIFT entry. In this embodiment of this application, an AND result is 0011. Therefore, the device B may modify the bit string in the BIER header to 0011, and send the BIER packet to the device C. During sending, a unicast address (for example, C::100) of the device C may be used in the destination address field in the IPv6 header. For another example, when the device B sends the BIER packet to the device E, the bit string in the BIER header may be modified to 0100. During sending, a unicast address (for example, E::100) of the device E may be used in the destination address field in the IPv6 header.

For the device E, because the device E determines, based on the identifier * in the forwarding table, that the neighboring device E is the device E, the device E used as an egress BFER in the BIER domain may obtain the original multicast packet from the BIER packet through decapsulation, and forward the multicast packet to a customer edge 1 (CE 1) based on information in an inner original multicast packet (for example, a destination address in the original multicast packet).

Likewise, the device C sends the packet to the device D and the device F based on the BIER packet header and the information about the bit string of the BIER packet header. During sending, a unicast address (for example, D::100) of the device D and a unicast address (for example, D::100) of the device F may be used in the destination address field in the IPv6 header.

For the device D, because the device D determines, based on the identifier * in the forwarding table, that the neighboring device D is the device D, the device D used as an egress BFER in the BIER domain may obtain the original multicast packet from the BIER packet through decapsulation, and forward the multicast packet to a CE 2 based on information in an inner original multicast packet (for example, a destination address in the original multicast packet).

For the device F, because the device F determines, based on the identifier * in the forwarding table, that the neighboring device F is the device F, the device F used as an egress BFER in the BIER domain may obtain the original multicast packet from the BIER packet through decapsulation, and forward the multicast packet to a CE 3 based on information in the inner original multicast packet (for example, a destination address in the original multicast packet).

Specifically, after receiving a BIER packet, an egress BFER in the BIER domain such as the device E needs to determine a VPN instance to which the multicast packet belongs, determines, based on the VPN instance, a virtual route forwarding (virtual route forwarding, VRF) table corresponding to the VPN instance, and forwards the multicast packet to a next hop (for example, the CE 1) in the VRF table based on information in an original multicast packet (for example, a destination address in the original multicast packet) and the VRF table.

It should be understood that the VPN is a technology for constructing a private network on a shared network, and a private network route is invisible on a public network. Therefore, the private network route may be stored in the VRF table.

It should be further understood that, on a forwarding plane, a service identifier may also be referred to as a VPN service identifier, and identifies a VPN instance.

In a conventional technical solution, a service identifier is carried in an MPLS label, and the service identifier may also be referred to as a VPN label. In other words, when a value of the Proto field in the BIER header is 2, it indicates that a packet following the BIER header is: VPN label+IP packet. The VPN label is an MPLS label with a length of 4 bytes, and identifies a mobile virtual private network (MVPN). Specifically, on a control plane, the BFIR generates a VPN label, associates a VPN label value with a VRF identifier, and sends the information together with the BFIR-ID to the BFER. After receiving the VPN label value and the VRF identifier, the BFER associates the VPN label value and the VRF identifier with a corresponding VRF. On a data plane, after receiving a packet that needs to be carried by the MVPN, the BFIR encapsulates the BIER header and the corresponding VPN label. When receiving the packet encapsulated with the BIER header and the VPN label, the BFER matches the packet with the corresponding VRF table based on the VPN label, and forwards the packet based on the VRF table.

In the foregoing technical solution, because a BIER packet includes one MPLS label layer, network-wide MPLS removal cannot be implemented, which is more complex for a device.

In another conventional technical solution, a VPN instance is identified by using a source address (SA) in a BIERv6 header. In other words, one BFIR (that is, an ingress edge node) may allocate a plurality of source IPv6 addresses, and different source IPv6 addresses represent different VPN instances. On the control plane, the BFIR generates different source IPv6 addresses, which are referred to as Src.DT, for different VPN instances, associates the source IPv6 addresses with VRF instances, and sends the correspondence between the source IPv6 addresses and the VRF instances to the BFER. After receiving the correspondence between the source IPv6 addresses and the VRF instances, the BFER associates the source IPv6 addresses and the VRF instances with a corresponding VRF. On the data plane, when receiving a packet that needs to be carried by the MVPN, the BFIR encapsulates the BIERv6 header and uses a source address SA in the BIERv6 header to identify a VPN instance. When receiving a packet encapsulated with the BIERv6 header, the BFER identifies the SA in the BIERv6 header, determines the corresponding VRF table based on the VPN instance identified by the SA, and forwards the packet based on the VRF table.

In the foregoing conventional technical solution, when a VPN instance is identified by using a source IPv6 address in a BIERv6 header, the source IPv6 address required for identifying the VPN instance needs to be managed and allocated.

In view of this, an embodiment of this application provides a BIER packet forwarding method. A proper field is selected in a BIER packet to carry a VPN service identifier. Therefore, when an egress edge node identifies a VPN instance, a source IPv6 address required for identifying the VPN instance does not need to be managed and allocated, so that implementation is relatively simple.

FIG. 6 is a schematic flowchart of a BIER packet forwarding method according to an embodiment of this application. As shown in FIG. 6, the method may include steps 610 to 630. The following provides detailed descriptions with reference to steps 610 to 630.

Step 610: A first network device receives a BIER packet sent by a second network device, where the BIER packet includes an IPv6 header, a BIER header, and a multicast packet, and a destination address of the IPv6 header or a first field of the BIER header carries a service identifier.

In an example, the first network device may correspond to the egress device (for example, the device D, the device E, or the device F) in FIG. 5, and the second network device may correspond to the ingress device (for example, the device A) in FIG. 5.

The service identifier carried in the destination address of the IPv6 header or the first field of the BIER header of the BIER packet identifies a virtual private network VPN instance. It should be understood that the service identifier may also be referred to as a VPN service identifier.

In a possible implementation, for example, the destination address of the IPv6 header of the BIER packet carries the service identifier. The destination address indicates to perform BIER forwarding on the BIER packet. The service identifier may be carried in a part of bits of the destination address, for example, may be carried in an argument (Argument) part of the destination address.

The following describes the implementation in detail.

Segment routing (SR) uses a segment identity (segment ID) in a packet to indicate an operation instruction in a network. For example, in segment routing over IPv6 (SRv6), an IPv6 address is used as an SRv6 SID, and is programmed in the SRv6 SID. In other words, a 128-bit SRv6 SID is divided into three parts: Location (Locator), Function, and Argument. Locator is used for routing and addressing. Function indicates a corresponding operation instruction. Argument is used for carrying a parameter required for executing the instruction.

BIERv6 is a technology that implements BIER forwarding on an IPv6 data plane, and uses a special IPv6 destination address (referred to as End.BIER) to indicate a device to perform BIER forwarding. End.BIER is encapsulated in the destination address DA field of the IPv6 header, and is an SRv6 SID with a special indication function and indicates a device to perform BIER forwarding locally.

It should be understood that an IPv6 address used in the destination address of the BIER packet is not a common IPv6 address, but a specific IPv6 address used for BIER packet processing, which is referred to as End.BIER. After a BFR router configures an address of End.BIER, a forwarding entry with a 128-bit mask of the address is generated in a forwarding information base (FIB), and the forwarding entry identifies the address as End.BIER. When receiving an IPv6 packet, the router first searches the FIB based on the destination address. If a result found from the FIB is an address of End.BIER, the router performs an action specific to End.BIER, that is, continues to process a BIER packet header in an IPv6 extension packet header. Otherwise, if the result is a common IPv6 destination address, the result found from the FIB indicates that the packet is an IPv6 packet that is sent to a local router and that includes a destination option extension header. In this case, the packet may be sent to a CPU for processing, and data plane processing cannot be performed.

In this embodiment of this application, End.BIER may be extended, so that End.BIER not only can indicate to perform BIER forwarding, but also can carry a VPN-related parameter, for example, the VPN service identifier. Specifically, End.BIER may be divided into three parts: Locator, Function, and Argument. The Locator and Function fields indicate a BIER forwarding operation, and the Argument field carries the VPN service identifier.

It should be noted that a length of the Argument field is not specifically limited in this embodiment of this application, and may be defined according to an actual requirement. For example, if the VPN service identifier is a 20-bit MPLS label value, the length of the Argument field may be defined as 20 bits.

In another possible implementation, for example, the first field of the BIER packet carries the service identifier. The first field may be any one or a combination of the following fields: a differentiated services code point DSCP field, a bit forwarding ingress router identifier BFIR-id field, and a protocol proto field. Specifically, the VPN service identifier may be carried by using one field in the BIER header, or the VPN service identifier may be carried by using a plurality of fields in the BIER header. This is not specifically limited in this application.

In this embodiment of this application, the field that carries the VPN service identifier in the BIER header may include but is not limited to a DSCP field, a proto field, and a BFIR-id field.

Step 620: The first network device determines a VRF table based on the service identifier and a first correspondence, where the first correspondence includes a correspondence between the service identifier and the VRF table.

After obtaining the service identifier, the first network device may determine the corresponding VRF table based on the first correspondence and the service identifier. The first correspondence includes the correspondence between the service identifier and the VRF table.

Before step 620, the method further includes: The first network device determines the first correspondence between the service identifier and the VRF table. There are a plurality of specific implementations. The following separately describes different implementations in detail.

In a possible implementation, the first network device may locally generate a corresponding service identifier for a VRF instance, and store a correspondence between the service identifier and a VRF table corresponding to the VRF instance. In this implementation, the first network device may further send the corresponding service identifier that is locally generated for the VRF instance to the second network device. Therefore, after receiving the multicast packet, the second network device may encapsulate the service identifier corresponding to the VRF instance into the BIER packet based on the VRF instance to which the multicast packet belongs. For a specific encapsulation manner, refer to the descriptions in step 610. Details are not described herein again.

In another possible implementation, the first network device receives a control packet, where the control packet includes the correspondence between the service identifier and the VRF table; and the first network device stores the correspondence.

Step 630: The first network device sends the multicast packet to a first customer edge CE device in the VRF table based on the VRF table.

As an egress device, the first network device may decapsulate the BIER packet to obtain an inner multicast packet, and forward the multicast packet based on a destination address of the multicast packet and the determined VRF table.

Specifically, the VRF table may include a plurality of VRF entries, and each VRF entry includes a next hop to the destination address. The first network device may determine a VRF entry in the VRF table based on the destination address of the multicast packet, and send the multicast packet to a next hop (for example, the first CE device) in the VRF entry.

In the foregoing technical solution, the destination address of the IPv6 header or the first field of the BIER header of the BIER packet carries the service identifier, so that a source IPv6 address required for identifying the VPN instance may not need to be managed and allocated, and an additional MPLS label layer does not need to be added either. Therefore, implementation is relatively simple, and device implementation complexity is reduced.

The following uses the BIER domain shown in FIG. 5 as an example to describe in detail, with reference to FIG. 7, a specific implementation process of a BIER packet forwarding method provided in an embodiment of this application.

It should be understood that the example in FIG. 7 is merely intended to help a person skilled in the art understand this embodiment of this application, but is not intended to limit this embodiment of this application to a specific value or a specific scenario in the example. A person skilled in the art can clearly make various equivalent modifications or changes based on the example provided in FIG. 7 below, and such modifications or changes also fall within the scope of embodiments of this application.

FIG. 7 is a schematic flowchart of another BIER packet forwarding method according to an embodiment of this application. As shown in FIG. 7, the method may include steps 710 to 750. The following separately describes steps 710 to 750 in detail.

Step 710: An ingress device in a BIER domain determines and stores a mapping relationship between a VPN service identifier and a VRF.

For example, a device A is used as the ingress device in the BIER domain. The device A needs to generate a corresponding VPN service identifier for a VPN, and generate the mapping relationship between a VPN service identifier and a VRF table.

In an example, the VPN service identifier may be a 20-bit MPLS label value, and the VPN service identifier may uniquely correspond to one VRF table on an ingress edge node and an egress edge node. For example, both the ingress edge node and the egress edge node use a VPN service identifier 100 to represent a VRF1 table. For another example, both the ingress edge node and the egress edge node use a VPN service identifier 101 to represent a VRF2 table.

In an example, the VPN service identifier may be a global identifier. The global identifier is globally unique, that is, different VPN service identifiers are used for different multicast groups.

A BFIR 1 may locally store the mapping relationship between a VPN service identifier and a VRF table. In an example, the following lists a possible mapping relationship by using Table 1.

TABLE 1

| Mapping relationship between a VPN service identifier and a VRF table | |
| --- | --- |
| VPN service identifier | VRF table |
| 100 | VRF$_1$ |
| 101 | VRF$_2$ |
| 102 | VRF$_3$ |
| . . . | . . . |

Optionally, if a VPN service identifier is a local identifier, for different multicast groups, if ingress nodes or egress nodes are different, a same VPN service identifier may be used. In this implementation, a BFER needs to store a mapping relationship between a source IPv6 address, a VPN service identifier, and a VRF table.

Step 720: An egress device in the BIER domain determines and stores the mapping relationship between a VPN service identifier and a VRF table.

For example, the egress device in the BIER domain is a device E. There are a plurality of implementations in which the device E determines the mapping relationship between a VPN service identifier and a VRF table. This is not specifically limited in this application. The following lists several possible implementations.

In a possible implementation, the mapping relationship between a VPN service identifier and a VRF table may be configured on the device E. For example, the VPN service identifier is a global identifier, and the mapping relationship between a VPN service identifier and a VRF table shown in Table 1 is configured. For another example, the VPN service identifier is a local identifier, and a mapping relationship shown in Table 2 is configured.

TABLE 2

| Mapping relationship between a source IPv6 address, a VPN service identifier, and a VRF table | | |
| --- | --- | --- |
| Source IPv6 address | VPN service identifier | VRF table |
| Address 1 | 100 | VRF$_1$ |
| Address 1 | 101 | VRF$_2$ |
| Address 1 | 102 | VRF$_3$ |
| | . . . | . . . |

In another possible implementation, after determining the mapping relationship between a VPN service identifier and a VRF table, the ingress device in the BIER domain may notify the device E of the mapping relationship by using a control packet. For example, the VPN service identifier is a global identifier, and the device E receives the mapping relationship between a VPN service identifier and a VRF table by using the control packet, and locally stores the mapping relationship between a VPN service identifier and a VRF table shown in Table 1. For another example, the VPN service identifier is a local identifier, the control packet sent by the ingress device in the BIER domain to the device E further includes an IPv6 address of the ingress device in the BIER domain, and the device E locally stores the mapping relationship between a source IPv6 address (an IPv6 address of the BFIR 1), a VPN service identifier, and a VRF table shown in Table 2.

In an example, the control packet may be a border gateway protocol (BGP) packet, and the ingress device in the BIER domain may notify the device E of the mapping relationship between a VPN service identifier and a VRF table by using the BGP packet.

Step 730: The ingress device in the BIER domain encapsulates the BIER packet, and sends the BIER packet to a BFR.

For example, the device A is used as the ingress device in the BIER domain. After receiving a multicast packet, the device A performs BIER encapsulation on the multicast packet based on a VPN instance to which the multicast packet belongs, to obtain a BIER packet. The BIER packet includes an IPv6 header, a BIER header, and an inner multicast.

The BIER packet may carry a VPN service identifier, and the VPN service identifier identifies the foregoing VPN instance. There are a plurality of specific implementations. This is not specifically limited in this application. In a possible implementation, the VPN service identifier may be carried by using a destination address DA of the IPv6 header. In another possible implementation, the VPN service identifier may alternatively be carried by using a field of the BIER header.

In an implementation in which the destination address DA carries the VPN service identifier, each BIER forwarding device needs to reserve an Argument field in an IPv6 address of End.BIER. Specifically, when End.BIER used for BIER forwarding is configured, an address block may be configured to represent the Argument field.

An example in which the Argument field carries a 20-bit VPN service identifier is used below to describe configuration of the reserved Argument field on the BIER forwarding node shown in FIG. 7:

configuration on the device A: end-bier 2001:db8:1000::/ 108 arguments 20;

configuration on a device B: end-bier 2001:db8:1001::/ 108 arguments 20;

configuration on a device C: end-bier 2001:db8:2000::/ 108 arguments 20; and configuration on the device E: end-bier 2001:db8:3000::/ 108 arguments 20.

Herein, end-bier indicates the IPv6 address (End.BIER) used for BIER forwarding. In addition, 2001:db8:1000::/108 is an IPv6 address block (End.BIER) with a mask length of 108, and arguments 20 indicates that the lowest 20 bits in the address block represent the Argument field.

It should be noted that, in this embodiment of this application, when the Argument field of End.BIER carries the VPN service identifier, and when the VPN service identifier changes, the Argument field changes, and the IPv6 address (End.BIER) of the device also changes.

For example, the VPN service identifier is 100, and in a BIER packet sent by the device A to the device B, the destination address DA of the IPv6 header uses an address 2001:db8:1001::64. Herein, 64 is hexadecimal, and corresponds to 100 in decimal notation, that is, the VPN service identifier is 100.

For another example, the VPN service identifier is 101, and in a BIER packet sent by the device A to the device B, the destination address DA of the IPv6 header uses an address 2001:db8:1001::65. Herein, 65 is hexadecimal, and corresponds to 101 in decimal notation, that is, the VPN service identifier is 101.

In an implementation in which the field of the BIER header carries the VPN service identifier, each BIER forwarding device does not need to reserve an Argument field in an IPv6 address of End.BIER. Each BIER forwarding node shown in FIG. 5 may configure an address when configuring an IPv6 address (End.BIER) used for BIER forwarding:

configuration on the device A: end-bier 2001:db8:1000::
1234;
configuration on the device B: end-bier 2001:db8:1001::
1234;
configuration on the device C: end-bier 2001:db8:2000::
1234; and
configuration on the device E: end-bier 2001:db8:3000::
1234

Herein, end-bier indicates the IPv6 address (End.BIER) used for BIER forwarding. In this example configuration, each node is provided with a complete 128-bit IPv6 address.

In this implementation, a field in the BIER header carries a VPN service identifier, and an IPv6 address (End.BIER) of a device does not change.

For example, the VPN service identifier is 100, and in a BIER packet sent by the device A to the device B, the destination address DA of the IPv6 header uses an address 2001:db8:1001::1234. In this case, the VPN service identifier 101 is encapsulated in the field of the BIER header according to the method of this embodiment. Then, the device B replicates the packet and sends the packet to the device C and a device D. Correspondingly, addresses of the device C and the device D are encapsulated as 2001:db8:2000::1234 and 2001:db8:3000::1234 In this case, the VPN service identifier 100 in the field of the BIER header remains unchanged.

For another example, the VPN service identifier is 101, and in a BIER packet sent by the device A to the device B, the destination address DA of the IPv6 header uses an address 2001:db8:1001::1234. In this case, the VPN service identifier 101 is encapsulated in the field of the BIER header according to the method of this embodiment. Then, the device B replicates the packet and sends the packet to the device C and a device D. Correspondingly, addresses of the device C and the device D are encapsulated as 2001:db8:2000::1234 and 2001:db8:3000::1234 In this case, the VPN service identifier 101 in the field of the BIER header remains unchanged.

Step 740: The BFR sends the received BIER packet to the egress device in the BIER domain.

After receiving the BIER packet, the BFR may send the BIER packet to the egress device in the BIER domain.

For example, the VPN service identifier is 100. A destination address DA of an IPv6 header of a BIER packet sent by the BFR to the device E uses an address 2001:db8:3000::64. Herein, 64 is hexadecimal, and corresponds to 100 in decimal notation, that is, the VPN service identifier is 100.

For example, the VPN service identifier is 101. A destination address DA of an IPv6 header of a BIER packet sent by the BFR to the device E uses an address 2001:db8:3000::65. Herein, 65 is hexadecimal, and corresponds to 101 in decimal notation, that is, the VPN service identifier is 101.

Step 750: The egress device in the BIER domain receives the BIER packet, and searches a corresponding VRF table to forward the packet.

After receiving the BIER packet, the egress device in the BIER domain may obtain the VPN service identifier from the BIER packet. In an example, the VPN service identifier is carried in the field of the BIER header, and the egress device in the BIER domain may obtain the VPN service identifier from the field of the BIER header. In another example, the VPN service identifier is carried in the destination address DA of the IPv6 header, and the egress device in the BIER domain may obtain the VPN service identifier from the DA.

After obtaining the VPN service identifier, the egress device in the BIER domain may determine a corresponding VRF table based on the locally stored mapping relationship between a VPN service identifier and a VRF table, and forward the multicast packet based on the VRF table.

For example, the device E is used as the egress device in the BIER domain, the VPN service identifier obtained by the device E is 100, and it may be determined, based on the mapping relationship shown in Table 1, that 100 corresponds to the VRF1 table. The device E may determine a specific VRF entry in the VRF table based on the destination address of the multicast packet, and send the multicast packet to a next hop (for example, a specific first CE device) in the VRF entry.

In the foregoing technical solution, the VPN service identifier is carried by using the IPv6 destination address encapsulated by the BIER or a part of fields of the BIER header encapsulated by the BIER, and the egress edge node only needs to obtain the VPN service identifier by reading the IPv6 destination address or the part of fields of the BIER header. This avoids management and allocation of a source IPv6 address required by using a source IPv6 address to identify a VPN instance in a conventional technical solution.

With reference to FIG. 1 to FIG. 7, the foregoing describes in detail the BIER packet forwarding methods provided in embodiments of this application. The following describes in detail apparatus embodiments of this application with reference to FIG. 8 to FIG. 13. It should be understood that the descriptions of the method embodiments correspond to descriptions of the apparatus embodiments. Therefore, for parts that are not described in detail, refer to the descriptions of the foregoing method embodiments.

FIG. 8 is a schematic diagram of a structure of a first network device 800 according to an embodiment of this application. The first network device 800 shown in FIG. 8 may perform corresponding steps performed by the first network device in the method in the foregoing embodiment. As shown in FIG. 8, the first network device 800 includes a receiving module 810, a processing module 820, and a sending module 830.

The receiving module 810 is configured to receive a BIER packet sent by a second network device, where the BIER packet includes an internet protocol version 6 IPv6 header, a bit index explicit replication BIER header, and a multicast packet, a destination address of the IPv6 header or a first field of the BIER header carries a service identifier, and the service identifier identifies a virtual private network VPN instance.

The processing module 820 is configured to determine a virtual route forwarding VRF table based on the service identifier and a first correspondence, where the first correspondence includes a correspondence between the service identifier and the VRF table.

The sending module 830 is configured to send the multicast packet to a first customer edge CE device in the VRF table based on the VRF table.

Optionally, the service identifier is carried in a part of bits of the destination address of the IPv6 header, and the destination address indicates to perform BIER forwarding on the BIER packet.

Optionally, the part of bits of the destination address is an argument part of the destination address.

In another possible implementation, the first field of the BIER header is any one or a combination of the following fields: a differentiated services code point DSCP field, a bit forwarding ingress router identifier BFIR-id field, and a protocol proto field.

Optionally, the receiving module 810 is further configured to receive a control packet, where the control packet includes the correspondence between the service identifier and the VRF table; and the processing module 820 is further configured to store the correspondence between the service identifier and the VRF table.

Optionally, the first correspondence further includes a source address; and the processing module 820 is specifically configured to determine the VRF table based on the source address of the IPv6 header, the service identifier, and the first correspondence.

Figure 9:
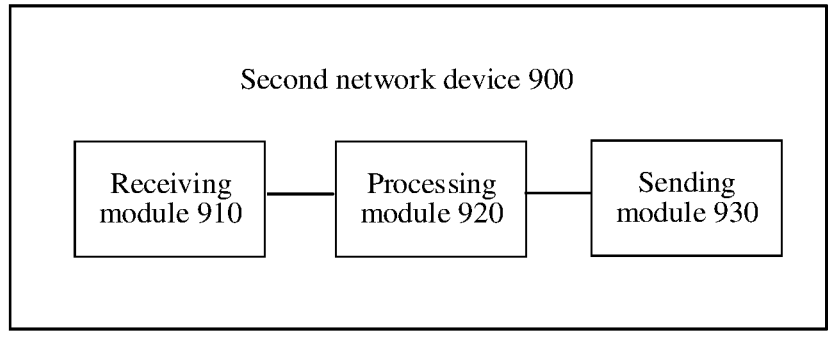
FIG. 9 is a schematic diagram of a structure of a second network device 900 according to an embodiment of this application.

FIG. 9 is a schematic diagram of a structure of a second network device 900 according to an embodiment of this application. The second network device 900 shown in FIG. 9 may perform corresponding steps performed by the second network device in the method in the foregoing embodiment. As shown in FIG. 9, the second network device 900 includes a receiving module 910, a processing module 920, and a sending module 930.

The receiving module 910 is configured to obtain a multicast packet.

The processing module 920 is configured to encapsulate the multicast packet based on a virtual private network VPN instance to which the multicast packet belongs, to obtain a BIER packet, where the BIER packet includes an internet protocol version 6 IPv6 header, a bit index explicit replication BIER header, and the multicast packet, a destination address of the IPv6 header or a first field of the BIER header carries a service identifier, and the service identifier identifies the VPN instance.

The sending module 930 is configured to send the BIER packet to a first network device.

Optionally, the service identifier is carried in a part of bits of the destination address of the IPv6 header, and the destination address indicates the first network device to perform BIER forwarding on the BIER packet.

Optionally, the part of bits of the destination address is an argument part of the destination address.

Optionally, the first field of the BIER header is any one or a combination of the following fields: a differentiated services code point DSCP field, a bit forwarding ingress router identifier BFIR-id field, and a protocol proto field.

Optionally, the processing module 920 is further configured to: allocate the service identifier to the VPN instance; and establish a first correspondence, where the first correspondence includes a correspondence between the service identifier and a VRF table corresponding to the VPN instance.

Optionally, the sending module 930 is further configured to send a control packet to the first network device, where the control packet includes the correspondence between the service identifier and the VRF table.

Optionally, the control packet is a border gateway protocol BGP packet.

Figure 10:
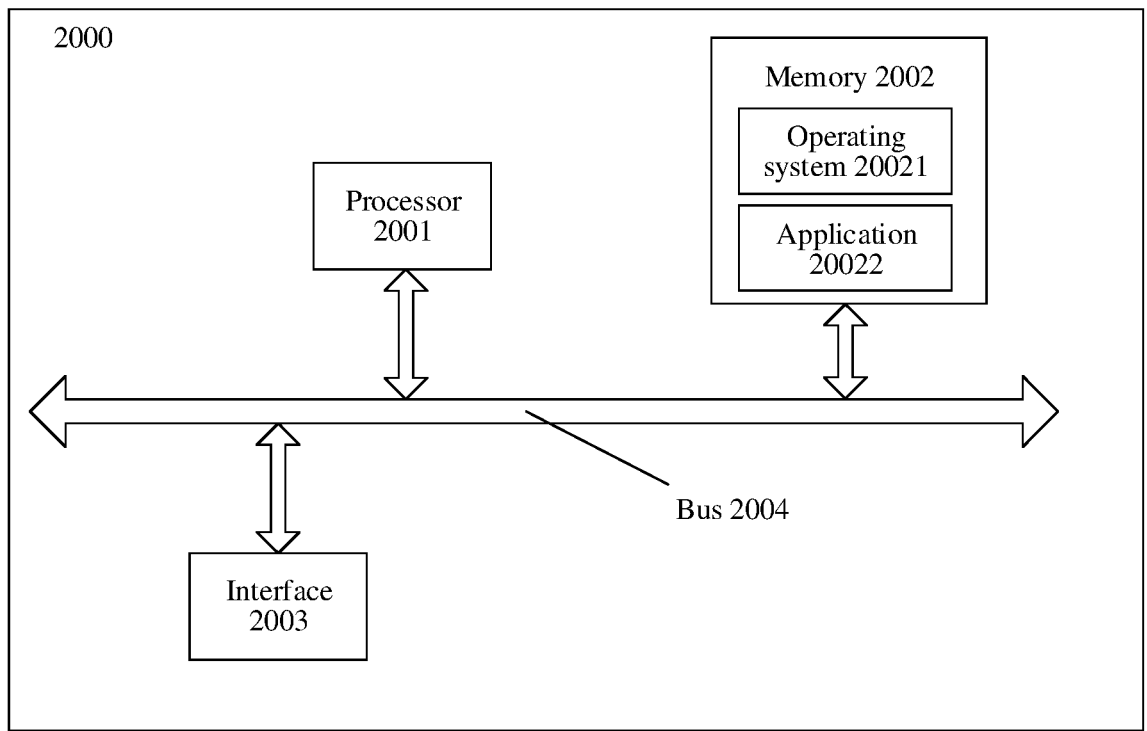
FIG. 10 is a schematic diagram of a hardware structure of a first network device 2000 according to an embodiment of this application.

FIG. 10 is a schematic diagram of a hardware structure of a first network device 2000 according to an embodiment of this application. The first network device 2000 shown in FIG. 10 may perform corresponding steps performed by the first network device in the method in the foregoing embodiment.

As shown in FIG. 10, the first network device 2000 includes a processor 2001, a memory 2002, an interface 2003, and a bus 2004. The interface 2003 may be implemented in a wireless or wired manner, and may be specifically a network adapter. The processor 2001, the memory 2002, and the interface 2003 are connected through the bus 2004.

The interface 2003 may specifically include a transmitter and a receiver, and is configured to enable the first network device to implement the foregoing receiving and sending. For example, the interface 2003 is configured to receive a BIER packet sent by a second network device, or is configured to send the multicast packet to a first customer edge CE device in the VRF table based on the VRF table.

The processor 2001 is configured to perform processing performed by the first network device in the foregoing embodiment. For example, the processor 2001 is configured to determine virtual route forwarding VRF based on the service identifier and a first correspondence; and/or is configured to perform another process of the technology described in this specification. The memory 2002 includes an operating system 20021 and an application 20022, and is configured to store a program, code, or instructions. When the processor or a hardware device executes the program, the code, or the instructions, a processing process related to the first network device in the method embodiment may be completed. Optionally, the memory 2002 may include a read-only memory (ROM) and a random access memory (RAM). The ROM includes a basic input/output system (BIOS) or an embedded system, and the RAM includes an application and an operating system. When the first network device 2000 needs to run, a bootloader in the BIOS or the embedded system built into the ROM is used for booting a system to start, to boot the first network device 2000 to enter a normal running state. After entering the normal running state, the first network device 2000 runs the application and the operating system in the RAM, to complete the processing process of the first network device 2000 in the method embodiment.

It can be understood that FIG. 10 merely shows a simplified design of the first network device 2000. The first network device may include any quantity of interfaces, processors, or memories during actual application.

Figure 11:
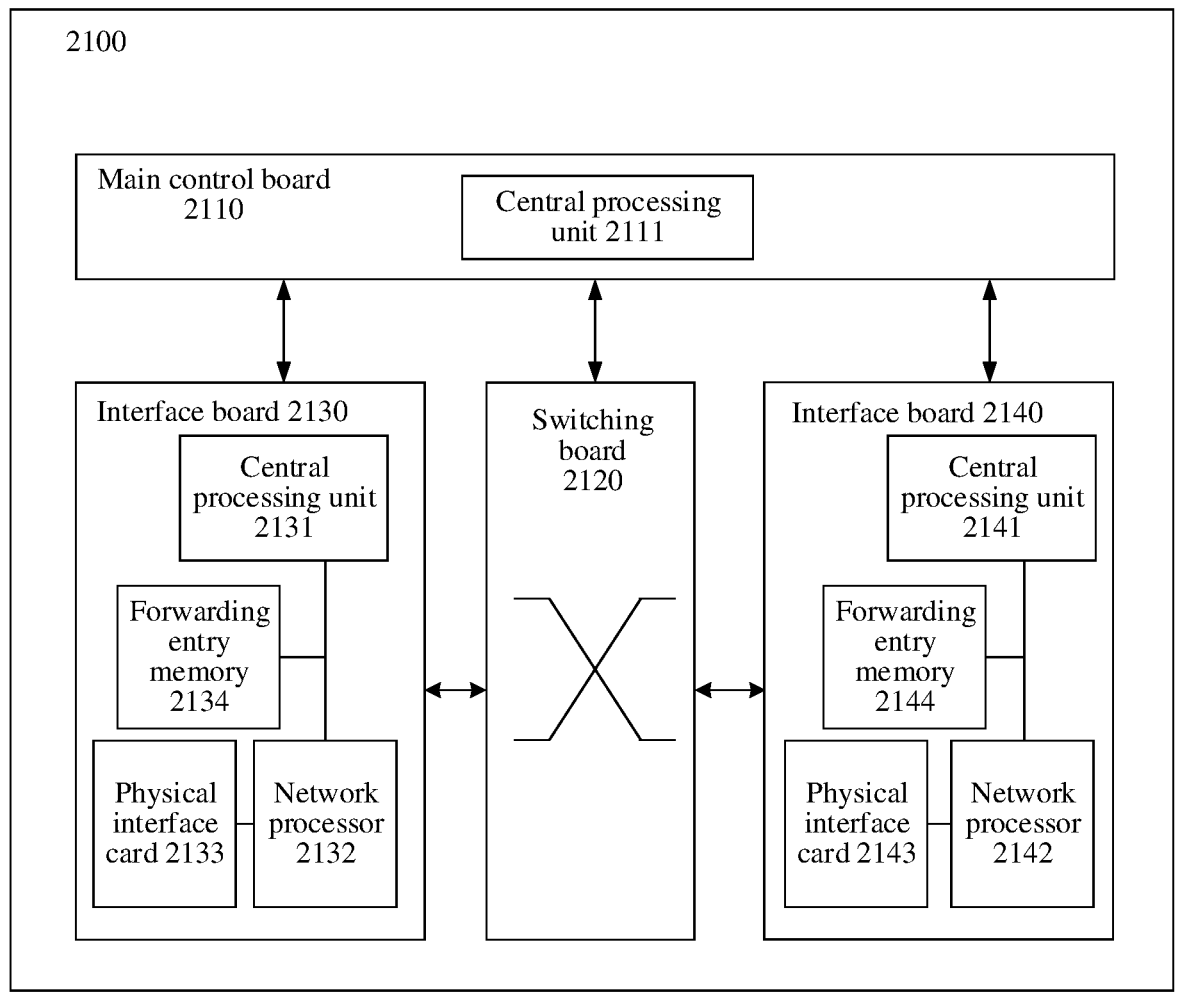
FIG. 11 is a schematic diagram of a hardware structure of another first network device 2100 according to an embodiment of this application.

FIG. 11 is a schematic diagram of a hardware structure of another first network device 2100 according to an embodiment of this application. The first network device 2100 shown in FIG. 11 may perform corresponding steps performed by the first network device in the method in the foregoing embodiment.

As shown in FIG. 11, the first network device 2100 includes a main control board 2110, an interface board 2130, a switching board 2120, and an interface board 2140. The main control board 2110, the interface board 2130, the interface board 2140, and the switching board 2120 are connected to a system backplane through a system bus for interworking. The main control board 2110 is configured to complete functions such as system management, device maintenance, and protocol processing. The switching board 2120 is configured to exchange data between the interface boards (the interface board is also referred to as a line card or a service board). The interface board 2130 and the interface board 2140 are configured to: provide various service interfaces (such as a POS interface, a GE interface, and an ATM interface), and forward a data packet.

The interface board 2130 may include a central processing unit 2131, a forwarding entry memory 4, a physical interface card 2133, and a network processor 2132. The central processing unit 2131 is configured to: control and manage the interface board, and communicate with a central processing unit on the main control board. The forwarding entry memory 2134 is configured to store an entry, for example, the foregoing BIFT. The physical interface card 2133 is configured to receive and send traffic.

It should be understood that an operation on the interface board 2140 is consistent with an operation on the interface board 2130 in this embodiment of this application. For brevity, details are not described again.

It should be understood that the first network device 2100 in this embodiment may correspond to the functions and/or the various implemented steps in the method embodiment. Details are not described herein again.

In addition, it should be noted that there may be one or more main control boards. When there are a plurality of main control boards, the main control boards may include an active main control board and a standby main control board. There may be one or more interface boards. A first network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the first network device may not include a switching board, and the interface board undertakes a service data processing function of an entire system. In a distributed forwarding architecture, the first network device may include at least one switching board, and implement data exchange between a plurality of interface boards by using the switching board, and provide large-capacity data exchange and processing capabilities. Therefore, the data access and processing capabilities of the first network device in the distributed architecture are stronger than those of the device in the centralized architecture. A specific architecture that is to be used depends on a specific networking deployment scenario. This is not limited herein.

Figure 12:
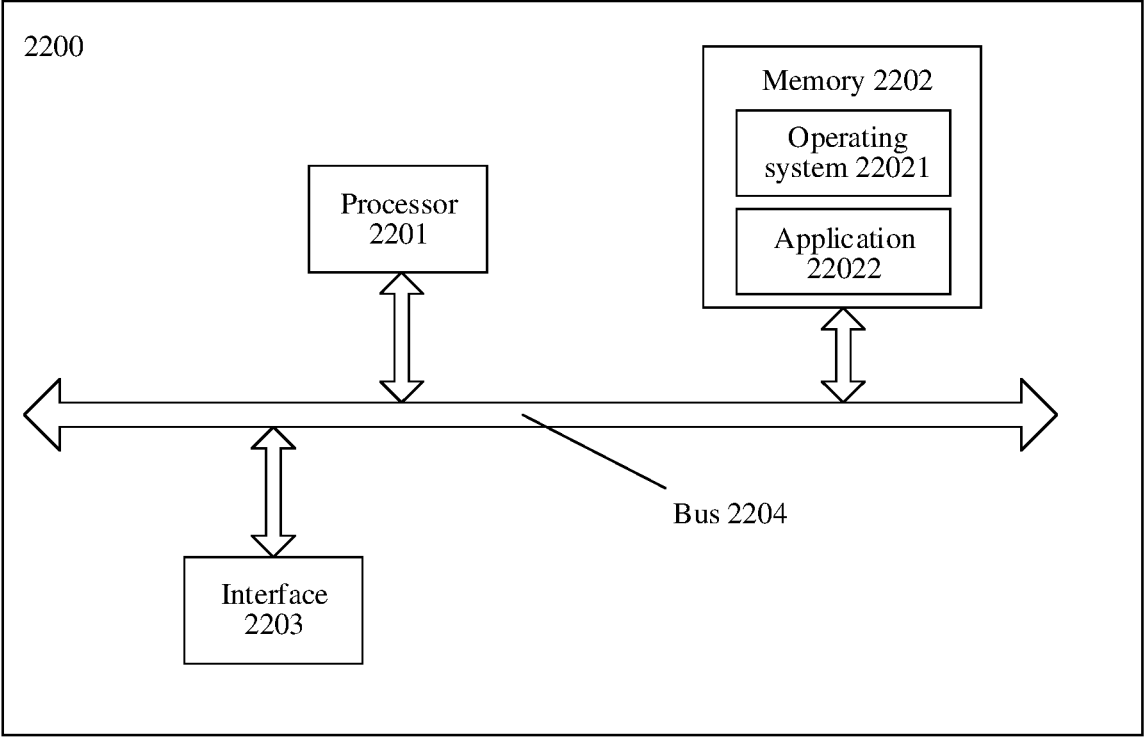
FIG. 12 is a schematic diagram of a hardware structure of a second network device 2200 according to an embodiment of this application.

FIG. 12 is a schematic diagram of a hardware structure of a second network device 2200 according to an embodiment of this application. The second network device 2200 shown in FIG. 12 may perform corresponding steps performed by the second network device in the method in the foregoing embodiment.

As shown in FIG. 12, the second network device 2200 includes a processor 2201, a memory 2202, an interface 2203, and a bus 2204. The interface 2203 may be implemented in a wireless or wired manner, and may be specifically a network adapter. The processor 2201, the memory 2202, and the interface 2203 are connected through the bus 2204.

The interface 2203 may specifically include a transmitter and a receiver, and is configured to: obtain a multicast packet; and send the BIER packet to a first network device. The processor 2201 is configured to perform processing performed by the second network device in the foregoing embodiment. For example, the processor 2201 is configured to encapsulate the multicast packet based on a virtual private network VPN instance to which the multicast packet belongs, to obtain a BIER packet; and/or is configured to perform another process of the technology described in this specification. The memory 2202 includes an operating system 22021 and an application 22022, and is configured to store a program, code, or instructions. When the processor or a hardware device executes the program, the code, or the instructions, a processing process related to the second network device in the method embodiment may be completed. Optionally, the memory 2202 may include a read-only memory (ROM) and a random access memory (RAM). The ROM includes a basic input/output system (BIOS) or an embedded system, and the RAM includes an application and an operating system. When the second network device 2200 needs to run, a bootloader in the BIOS or the embedded system built into the ROM is used for booting a system to start, to boot the second network device 2200 to enter a normal running state. After entering the normal running state, the second network device 2200 runs the application and the operating system in the RAM, to complete the processing process of the second network device 2200 in the method embodiment.

It can be understood that FIG. 12 merely shows a simplified design of the second network device 2200. The second network device may include any quantity of interfaces, processors, or memories during actual application.

FIG. 13 is a schematic diagram of a hardware structure of another second network device 2300 according to an embodiment of this application. The second network device 2300 shown in FIG. 13 may perform corresponding steps performed by the second network device in the method in the foregoing embodiment.

As shown in FIG. 13, the second network device 2300 includes a main control board 2310, an interface board 2330, a switching board 2320, and an interface board 2340. The main control board 2310, the interface board 2330, the interface board 2340, and the switching board 2320 are connected to a system backplane through a system bus for interworking. The main control board 2310 is configured to complete functions such as system management, device maintenance, and protocol processing. The switching board 2320 is configured to exchange data between the interface boards (the interface board is also referred to as a line card or a service board). The interface board 2330 and the interface board 2340 are configured to: provide various service interfaces (such as a POS interface, a GE interface, and an ATM interface), and forward a data packet.

The interface board 2330 may include a central processing unit 2331, a forwarding entry memory 2334, a physical interface card 2333, and a network processor 2332. The central processing unit 2331 is configured to: control and manage the interface board, and communicate with a central processing unit on the main control board. The forwarding entry memory 2334 is configured to store an entry, for example, the foregoing BIFT. The physical interface card 2133 is configured to receive and send traffic.

It should be understood that an operation on the interface board 2340 is consistent with an operation on the interface board 2330 in this embodiment of this application. For brevity, details are not described again. It should be understood that the second network device 2300 in this embodiment may correspond to the functions and/or the various implemented steps in the method embodiment. Details are not described herein again.

In addition, it should be noted that there may be one or more main control boards. When there are a plurality of main control boards, the main control boards may include an active main control board and a standby main control board. There may be one or more interface boards. A second network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the second network device may not include a switching board, and the interface board undertakes a service data processing function of an entire system. In a distributed forwarding architecture, the second network device may include at least one switching board, to implement data exchange between a plurality of interface boards by using the switching board, and provide large-capacity data exchange and processing capabilities. Therefore, the data access and processing capabilities of the second network device in the distributed architecture are stronger than those of the device in the centralized architecture. A specific architecture that is to be used depends on a specific networking deployment scenario. This is not limited herein.

An embodiment of this application further provides a computer-readable medium. The computer-readable medium stores program code. When the computer program code is run on a computer, the computer is enabled to perform the method performed by the first network device. The computer-readable medium includes but is not limited to one or more of the following: a read-only memory (ROM), a programmable ROM (PROM), an erasable PROM (EPROM), a flash memory, an electrically EPROM (EEPROM), and a hard drive.

An embodiment of this application further provides a computer-readable medium. The computer-readable medium stores program code. When the computer program code is run on a computer, the computer is enabled to perform the method performed by the second network device. The computer-readable medium includes but is not limited to one or more of the following: a read-only memory (ROM), a programmable ROM (PROM), an erasable PROM (EPROM), a flash memory, an electrically EPROM (EEPROM), and a hard drive.

An embodiment of this application further provides a chip system applied to a first network device. The chip system includes at least one processor, at least one memory, and an interface circuit. The interface circuit is responsible for information exchange between the chip system and the outside. The at least one memory, the interface circuit, and the at least one processor are connected through a line. The at least one memory stores instructions. The instructions are executed by the at least one processor, to perform operations of the first network device in the methods in the foregoing aspects.

In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

An embodiment of this application further provides another chip system applied to a second network device. The chip system includes at least one processor, at least one memory, and an interface circuit. The interface circuit is responsible for information exchange between the chip system and the outside. The at least one memory, the interface circuit, and the at least one processor are connected through a line. The at least one memory stores instructions. The instructions are executed by the at least one processor, to perform operations of the second network device in the methods in the foregoing aspects.

In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

An embodiment of this application further provides a computer program product applied to a first network device. The computer program product includes a series of instructions, and when the instructions are run, operations of the first network device in the methods in the foregoing aspects are performed.

An embodiment of this application further provides a computer program product applied to a second network device. The computer program product includes a series of instructions, and when the instructions are run, operations of the second network device in the methods in the foregoing aspects are performed.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one place, or may be distributed on a plurality of network units. Some or all of the units may be selected according to actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or a part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A bit index explicit replication (BIER) packet forwarding method, wherein the method comprises:
   receiving, by a first network device, a BIER packet sent by a second network device, wherein the BIER packet comprises an internet protocol version 6 (IPv6) header, a bit index explicit replication (BIER) header, and a multicast packet, wherein a destination address of the IPv6 header carries a service identifier, and the service identifier identifies a virtual private network (VPN) instance, wherein the service identifier is carried in a part of bits of the destination address of the IPv6 header, and the destination address indicates to perform BIER forwarding on the BIER packet, and wherein the part of bits of the destination address is an argument part of the destination address;
   determining, by the first network device, a virtual route forwarding (VRF) table based on the service identifier and a first correspondence, wherein the first correspondence is between the service identifier and the VRF table; and
   sending, by the first network device, the multicast packet to a first customer edge (CE) device in the VRF table based on the VRF table.

2. The method according to claim 1, further comprising:
   receiving, by the first network device, a control packet, wherein the control packet comprises the first correspondence between the service identifier and the VRF table; and
   storing, by the first network device, the first correspondence between the service identifier and the VRF table.

3. The method according to claim 1, wherein the first correspondence further comprises a source address; and
   wherein determining, by the first network device, the virtual route forwarding (VRF) table based on the service identifier and the first correspondence comprises:
   determining, by the first network device, the VRF table based on the source address of the IPv6 header, the service identifier, and the first correspondence.

4. The method according to claim 1, wherein the first network device is a bit forwarding egress router (BFER).

5. The method according to claim 1, wherein a locator field and a function field of the destination address indicate a BIER forwarding operation.

6. A bit index explicit replication (BIER) packet forwarding method, the method comprising:
   obtaining, by a second network device, a multicast packet;

encapsulating, by the second network device, the multicast packet based on a virtual private network (VPN) instance to which the multicast packet belongs, to obtain a BIER packet, wherein the BIER packet comprises an internet protocol version 6 (IPv6) header, a bit index explicit replication (BIER) header, and the multicast packet, and wherein a destination address of the IPv6 header carries a service identifier, and the service identifier identifies the VPN instance, and wherein the service identifier is carried in a part of bits of the destination address of the IPv6 header, and the destination address indicates to perform BIER forwarding on the BIER packet, and wherein the part of bits of the destination address is an argument part of the destination address; and
   sending, by the second network device, the BIER packet to a first network device.

7. The method according to claim 6, further comprising:
   allocating, by the second network device, the service identifier to the VPN instance; and
   establishing, by the second network device, a first correspondence, wherein the first correspondence is between the service identifier and a virtual route forwarding (VRF) table corresponding to the VPN instance.

8. The method according to claim 7, further comprising:
   sending, by the second network device, a control packet to the first network device, wherein the control packet comprises the first correspondence between the service identifier and the VRF table.

9. The method according to claim 8, wherein the control packet is a border gateway protocol (BGP) packet.

10. The method according to claim 6, wherein the first network device is a bit forwarding egress router (BFER).

11. The method according to claim 6, wherein a locator field and a function field of the destination address indicate a BIER forwarding operation.

12. A first network device, comprising:
   a non-transitory memory storing instructions; and
   at least one processor coupled to the non-transitory memory;
   wherein the instructions, when executed by the at least one processor, cause the first network device to be configured to:
   receive a bit index explicit replication (BIER) packet sent by a second network device, wherein the BIER packet comprises an internet protocol version 6 (IPv6) header, a bit index explicit replication (BIER) header, and a multicast packet, wherein a destination address of the IPv6 header carries a service identifier, and the service identifier identifies a virtual private network (VPN) instance, and wherein the service identifier is carried in a part of bits of the destination address of the IPv6 header, and the destination address indicates to perform BIER forwarding on the BIER packet, and wherein the part of bits of the destination address is an argument part of the destination address;
   determine a virtual route forwarding (VRF) table based on the service identifier and a first correspondence, wherein the first correspondence is between the service identifier and the VRF table; and
   send the multicast packet to a first customer edge (CE) device in the VRF table based on the VRF table.

13. The first network device according to claim 12, wherein the instructions, when executed by the processor, further cause the first network device to be configured to:

receive a control packet, wherein the control packet comprises the first correspondence between the service identifier and the VRF table; and store the first correspondence between the service identifier and the VRF table.

14. The first network device according to claim 12, wherein the first correspondence further comprises a source address; and the instructions, when executed by the processor, further cause the first network device to be configured to:

determine the VRF table based on the source address of the IPv6 header, the service identifier, and the first correspondence.

15. The first network device according to claim 12, wherein the first network device is a bit forwarding egress router (BFER).

16. A second network device, comprising:

a non-transitory memory storing instructions; and at least one processor coupled to the non-transitory memory; wherein the instructions, when executed by the at least one processor, cause the second network device to be configured to:

obtain a multicast packet;

encapsulate the multicast packet based on a virtual private network (VPN) instance to which the multicast packet belongs, to obtain a bit index explicit replication (BIER) packet, wherein the BIER packet comprises an internet protocol version 6 (IPv6) header, a bit index explicit replication (BIER) header, and the multicast packet, wherein a destination address of the IPv6 header carries a service identifier, and the service identifier identifies the VPN instance, and wherein the service identifier is carried in a part of bits of the destination address of the IPv6 header, and the destination address indicates to perform BIER forwarding on the BIER packet, and wherein the part of bits of the destination address is an argument part of the destination address; and send the BIER packet to a first network device.

17. The second network device according to claim 16, wherein the instructions, when executed by the at least one processor, further cause the first network device to be configured to:

allocate the service identifier to the VPN instance; and establish a first correspondence between the service identifier and a virtual route forwarding (VRF) table corresponding to the VPN instance.

18. The second network device according to claim 17, wherein the instructions, when executed by the at least one processor, further cause the first network device to be configured to:

send a control packet to the first network device, wherein the control packet comprises the correspondence between the service identifier and the VRF table.

19. The second network device according to claim 18, wherein the control packet is a border gateway protocol (BGP) packet.

20. The second network device according to claim 16, wherein the first network device is a bit forwarding egress router (BFER).

* * * * *